US008804600B2

(12) United States Patent
Suda

(10) Patent No.: US 8,804,600 B2
(45) Date of Patent: Aug. 12, 2014

(54) RELAY APPARATUS, TRANSMITTING APPARATUS, COMMUNICATION SYSTEM, RECEIVING APPARATUS, AND COMMUNICATION METHOD

(75) Inventor: Kenji Suda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 427 days.

(21) Appl. No.: 13/273,272

(22) Filed: Oct. 14, 2011

(65) Prior Publication Data

US 2012/0033609 A1 Feb. 9, 2012

Related U.S. Application Data

(63) Continuation of application No. PCT/JP2009/059535, filed on May 25, 2009.

(51) Int. Cl.
*H04B 7/14* (2006.01)
*H04B 7/204* (2006.01)
*H04B 7/155* (2006.01)
*H04W 72/04* (2009.01)
*H04W 84/04* (2009.01)

(52) U.S. Cl.
CPC ........... *H04B 7/155* (2013.01); *H04W 72/0413* (2013.01); *H04W 84/045* (2013.01)
USPC .............................. 370/315; 370/316; 370/319

(58) Field of Classification Search
USPC .......................................... 370/315, 316, 319
See application file for complete search history.

(56) References Cited

U.S. PATENT DOCUMENTS

| 7,701,935 | B2 | 4/2010 | Fukuzawa et al. | |
|---|---|---|---|---|
| 2006/0080581 | A1* | 4/2006 | Ono | 714/704 |
| 2007/0153716 | A1* | 7/2007 | Fukuzawa et al. | 370/315 |
| 2009/0227201 | A1* | 9/2009 | Imai et al. | 455/7 |
| 2009/0252200 | A1* | 10/2009 | Dohler et al. | 375/141 |
| 2010/0279601 | A1* | 11/2010 | Phan et al. | 455/7 |
| 2010/0284448 | A1 | 11/2010 | Miyoshi et al. | |
| 2011/0092154 | A1* | 4/2011 | Horiuchi et al. | 455/7 |
| 2011/0256827 | A1* | 10/2011 | Hart | 455/9 |

FOREIGN PATENT DOCUMENTS

| EP | 1 852 986 | 11/2007 |
|---|---|---|
| JP | 2001-36586 | 2/2001 |
| JP | 2007-208955 | 8/2007 |
| JP | 2009-49938 | 3/2009 |
| WO | 2006/093286 | 9/2006 |
| WO | 2006/098273 | 9/2006 |

OTHER PUBLICATIONS

International Search Report dated Aug. 18, 2009, from corresponding International Application No. PCT/JP2009/059535.

(Continued)

*Primary Examiner* — Kenny Lin
(74) *Attorney, Agent, or Firm* — Katten Muchin Rosenman LLP

(57) ABSTRACT

In a communication system that further includes a receiving apparatus and a transmitting apparatus that after a given period that starts after transmission of a wireless signal to the receiving apparatus, receives delivery confirmation information concerning the wireless signal, a relay apparatus includes a receiver that receives and decodes the wireless signal transmitted by the transmitting apparatus; a determiner that determines whether the decoded wireless signal is subject to relay; a notifier that, if the determiner determines that the wireless signal is subject to relay, notifies the transmitting apparatus of relay information indicating that the wireless signal is to be regenerated and relayed; and a transmitter that transmits to the receiving apparatus, the wireless signal that has been determined to be subject to relay.

15 Claims, 33 Drawing Sheets

(56) References Cited

OTHER PUBLICATIONS

Kenichi Higuchi et al. "Investigations on Relay Transmission Schemes in LTE-Advanced" the Institute of Electronics, Information and Communication Engineers, Information and Systems Society 2008 Conference, Sep. 16, 2008, p. 328.

International Preliminary Report on Patentability and Written Opinion of the International Searching Authority dated Nov. 29, 2011 and Dec. 12, 2011, from corresponding International Application No. PCT/JP2009/059535.

Notice of Rejection dated Apr. 23, 2013, from corresponding Japanese Application No. 2011-515767.

* cited by examiner

RELAY APPARATUS, TRANSMITTING APPARATUS, COMMUNICATION SYSTEM, RECEIVING APPARATUS, AND COMMUNICATION METHOD

CROSS REFERENCE TO THE RELATED APPLICATIONS

This application is a continuation application of International Application PCT/JP2009/059535, filed May 25, 2009, and designating the U.S., the entire contents of which are incorporated herein by reference.

FIELD

Embodiments discussed herein are related to a relay apparatus, a transmitting apparatus, a communication system, a receiving apparatus, and a communication method.

BACKGROUND

Long Term Evolution (LTE) of the 3rd Generation Partnership Project (3GPP) has been standardized as a next generation wireless communication method. Discussion concerning LTE-Advanced has also begun. In this regard, the introduction of relay stations (relay node (RN)) as technology to improve cell coverage and the efficiency of frequency utilization is under investigation (see, for example, Higuchi, Kenichi, et al, "Investigations on Relay Transmission Schemes in LTE-Advanced", The Institute of Electronics, Information and Communication Engineers, Information and Systems Society 2008 Conference, Sep. 16, 2008, p. 328).

SUMMARY

According to an aspect of the embodiments, in a communication system that further includes a receiving apparatus and a transmitting apparatus that after a given period that starts after transmission of a wireless signal to the receiving apparatus, receives delivery confirmation information concerning the wireless signal, a relay apparatus includes a receiver that receives and decodes the wireless signal transmitted by the transmitting apparatus; a determiner that determines whether the decoded wireless signal is subject to relay; a notifier that, if the determiner determines that the wireless signal is subject to relay, notifies the transmitting apparatus of relay information indicating that the wireless signal is to be regenerated and relayed; and a transmitter that transmits to the receiving apparatus, the wireless signal that has been determined to be subject to relay.

The object and advantages of the embodiments will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

The embodiments will be explained with reference to the accompanying drawings.

While inventing the embodiments, observations were made regarding a related art. Such observations include the following, for example.

Schemes employed by an RN include, for example, an amplitude and forward (AP) scheme in which a received radio (RF) signal is directly amplified and transmitted; and a decode and forward (DF) scheme in which a received signal is demodulated, decoded and then regenerated and relayed. Since the DF scheme decodes, regenerates, and relays the received signal, noise removal and rescheduling is possible.

Further, a base station (eNB) receives, at a predetermined reception timing, delivery confirmation information (ACK or NACK) concerning a wireless signal transmitted to a user terminal (user equipment (UE)). If the received delivery confirmation information is NACK, the eNB performs retransmission control (Automatic Repeat Request (ARQ)) of retransmitting the wireless signal. Hybrid ARQ (HARQ), which is a combination of error correction and retransmission control, is also used.

However, with the above conventional technology, since the wireless signal is delayed consequent to the regeneration and relay by the wireless relay apparatus, the transmission of the delivery confirmation information by the receiving apparatus that receives the wireless signal is also delayed. Consequently, a problem arises in that it becomes difficult for the delivery confirmation information to be received at the predetermined timing at the transmitting apparatus that transmitted the wireless signal. As a result, for example, delivery confirmation information concerning regenerated and relayed wireless signals, misses the reception timing at the transmitting apparatus and retransmission operation is continuously performed, making retransmission control unstable.

In the embodiments, a relay apparatus, transmitting apparatus, communication system, receiving apparatus, and communication method notify an eNB that the wireless signal transmitted by the eNB is to be regenerated and relayed by an RN. Consequently, at the eNB, the timing at which delivery confirmation information is received in response to the wireless signal is adjusted by the period of delay caused by the regeneration and relay, thereby stabilizing retransmission control.

Figure 1:
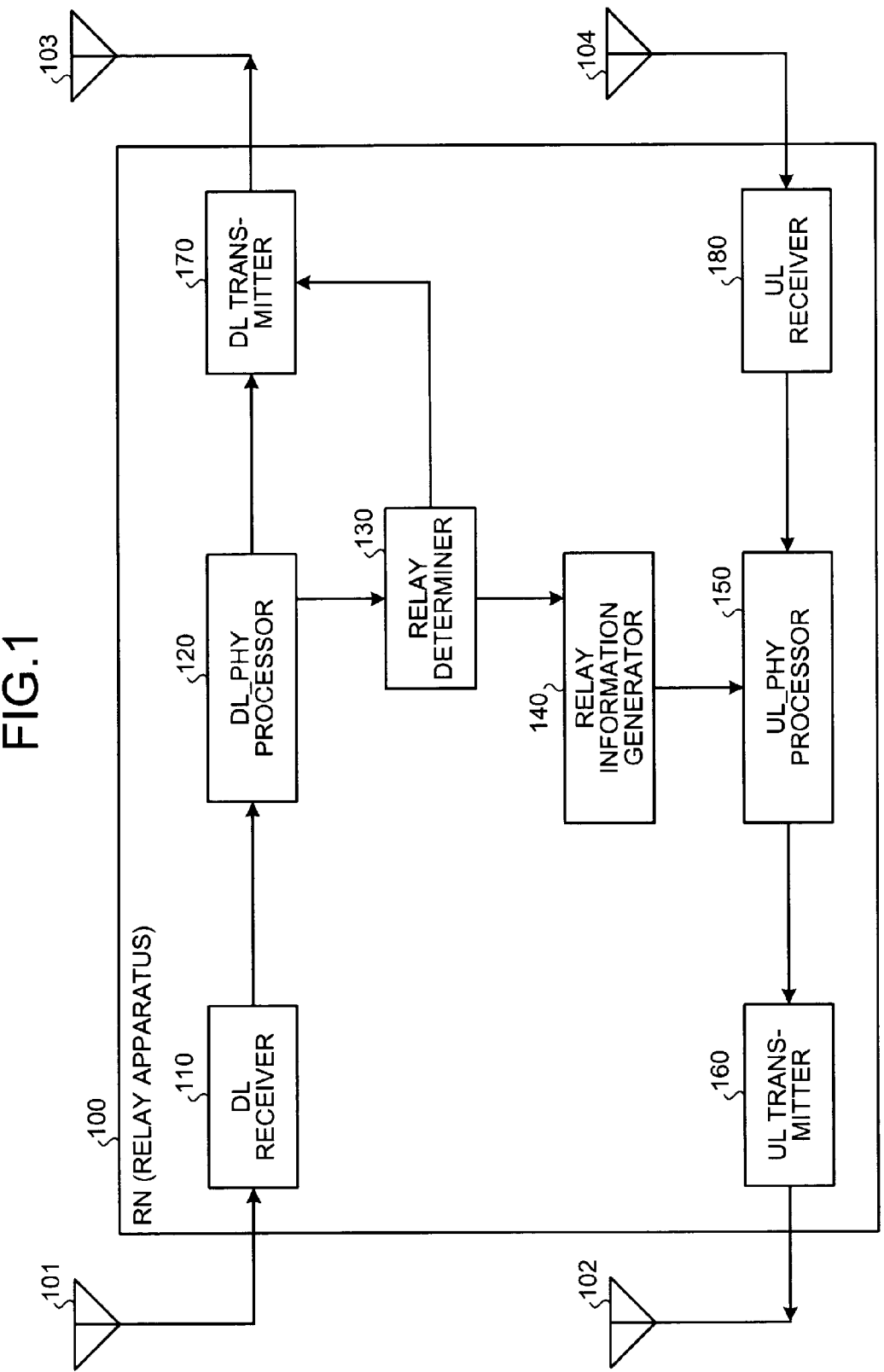
FIG. 1 is a block diagram of an RN according to a first embodiment.

FIG. 1 is a block diagram of an RN according to a first embodiment. The RN according to the first embodiment is a relay apparatus that is in a communication system that includes an eNB (refer to FIG. 2) and a UE (refer to FIG. 3), and that regenerates and relays a wireless signal that is transmitted to the UE by the eNB. After a given period from the transmission of the wireless signal to the UE, the eNB receives from the UE, delivery confirmation information concerning the wireless signal.

As depicted in FIG. 1, an RN 100 according to the first embodiment includes a DL receiving antenna 101, a UL transmitting antenna 102, a DL transmitting antenna 103, a UL receiving antenna 104, a DL receiver 110, a DL_PHY processor 120, a relay determiner 130, a relay information generator 140, a UL_PHY processor 150, a UL transmitter 160, a DL transmitter 170, and a UL receiver 180. The DL_PHY processor 120, the relay determiner 130, and the UL_PHY processor 150 are, for example, implemented by a computing unit such as a central processing unit (CPU).

The DL receiver 110 receives, via the DL receiving antenna 101, a downlink wireless signal transmitted by the eNB. The wireless signal transmitted by the DL receiver 110 includes Physical Downlink Control Channel (PDCCH) control information and Physical Downlink Shared Channel (PDSCH) data.

The control information, for example, includes the source (in this example, eNB) and the destination (in this example, UE) of the wireless signal. The DL receiver 110 decodes the received control information and data, and outputs the decoded control information and data to the DL_PHY processor 120.

The DL_PHY processor 120 performs layer 1 (physical layer) processing on the control information and data received from the DL receiver 110. The DL_PHY processor 120 outputs the processed control information to the relay determiner 130. The DL_PHY processor 120 further outputs the processed control information and data to the DL transmitter 170.

The relay determiner 130, based on the control information received from the DL_PHY processor 120, determines whether the wireless signal received by the DL receiver 110 is subject to relay by the RN 100. For example, the memory of the RN 100 stores therein registration information indicating the destination of each wireless signal subject to relay by the RN 100 and the relay determiner 130 determines whether the destination of the wireless signal indicated in the control information is included in the registration information, and thereby determines whether the wireless signal is subject to relay by the RN 100. The relay determiner 130 outputs a determination result to the DL transmitter 170 and the relay information generator 140, respectively.

The relay information generator 140 generates relay information and outputs the generated relay information to the UL_PHY processor 150, if the determination results received from the relay determiner 130 indicate that the wireless signal is subject to relay by the RN 100. The relay information generated by the relay information generator 140 is information indicating that the wireless signal transmitted by the eNB to the UE, is subject to relay by the RN 100.

Upon receiving the relay information from the relay information generator 140, the UL_PHY processor 150 assigns the relay information to a Physical Uplink Control Channel (PUCCH), and outputs the PUCCH assigned relay information to the UL transmitter 160. Further, the UL_PHY processor 150 performs layer 1 (physical layer) processing on delivery confirmation information (ACK or NACK) received from the UL receiver 180, and outputs the processed delivery confirmation information to the UL transmitter 160.

The UL transmitter 160 encodes the relay information received from the UL_PHY processor 150 and transmits the encoded relay information to eNB, via the UL transmitting antenna 102. Further, the UL transmitter 160 encodes the delivery confirmation information received from the UL_PHY processor 150 and transmits the encoded delivery confirmation information to the eNB, via the UL transmitting antenna 102.

If the determination results received from the relay determiner 130 indicate that the wireless signal is subject to relay by the RN 100, the DL transmitter 170 encodes the control information and data received from the DL_PHY processor 120, and transmits the encoded control information and data to the UE, via the DL transmitting antenna 103.

The UL receiver 180 receives, via the UL receiving antenna 104, a wireless signal transmitted by the UE and decodes the received delivery confirmation information. The wireless signal received by the UL receiver 180 includes PUCCH control information. The PUCCH control information includes delivery confirmation information (ACK or NACK) concerning the wireless signal, which has been transmitted by the eNB and, regenerated and relayed by the RN 100. The UL receiver 180 outputs the decoded control information to the UL_PHY processor 150.

Figure 2:
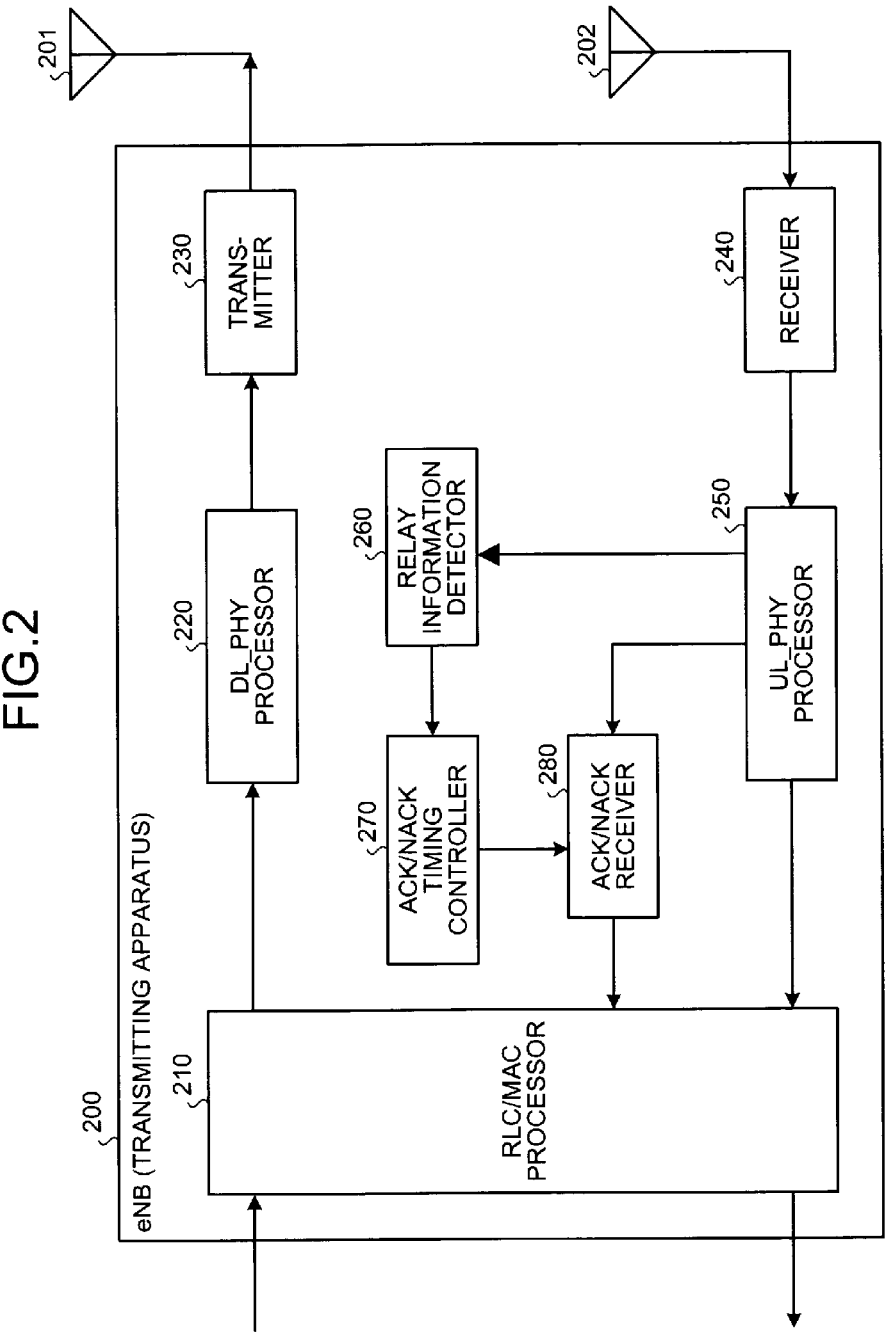
FIG. 2 is a block diagram of an eNB according to the first embodiment.

FIG. 2 is a block diagram of an eNB according to the first embodiment. The eNB according to the first embodiment is a transmitting apparatus that transmits a wireless signal to the UE and after a given period from the transmission of the wireless signal, receives from the UE, delivery confirmation information concerning the transmitted wireless signal. As depicted in FIG. 2, an eNB 200 according to the first embodiment includes a transmitting antenna 201, a receiving antenna 202, an RLC/MAC processor 210, a DL_PHY processor 220, a transmitter 230, a receiver 240, a UL_PHY processor 250, a relay information detector 260, an ACK/NACK timing controller 270, and an ACK/NACK receiver 280.

The RLC/MAC processor 210, for example, receives from a higher level information processor, downlink data addressed to the UE. The RLC/MAC processor 210 performs layer 2 processing on the received data. Layer 2 processing, for example, is Radio Link Control (RLC) layer processing and Medium Access Control (MAC) layer processing. The RLC/MAC processor 210 outputs the layer 2 processed data as well as layer 2 control information to the DL_PHY processor 220.

Further, the RLC/MAC processor 210, based on delivery confirmation information (ACK or NACK) received from the ACK/NACK receiver 280, performs retransmission control of the control information and data that are output to the DL_PHY processor 220. For example, if the RLC/MAC processor 210 receives NACK from the ACK/NACK receiver 280, the RLC/MAC processor 210 retransmits the control information and data to DL_PHY processor 220.

If ACK is received from the ACK/NACK receiver 280, the RLC/MAC processor 210 does not retransmit the data. The RLC/MAC processor 210 performs layer 2 processing on uplink control information and data received from the UL_PHY processor 250 and outputs the processed control information and data, for example, to a higher level information processor.

The DL_PHY processor 220 performs layer 1 processing on the control information and data received from the RLC/MAC processor 210. The DL_PHY processor 220 assigns the layer 1 processed control information to the PDCCH and outputs the PDCCH assigned control information to the transmitter 230. Further, the DL_PHY processor 220 assigns the layer 1 processed data to the PDSCH and outputs the PDSCH assigned data to the transmitter 230.

The transmitter 230 transmits, via the transmitting antenna 201, the control information received from the DL_PHY processor 220. The transmitter 230 further transmits, via the transmitting antenna 201, the data received from the DL_PHY processor 220. The control information and data transmitted by the transmitter 230 are received by the RN 100 (refer to FIG. 1).

The receiver 240 receives, via the receiving antenna 202, an uplink wireless signal transmitted by the RN 100. The wireless signal received by the receiver 240 includes PUCCH control information and Physical Uplink Shared Channel (PUSCH) data.

The PUCCH control information includes relay information transmitted by the RN 100. The PUCCH control information further includes delivery confirmation information that is from the UE and concerns the wireless signal transmitted by the eNB 200. The receiver 240 decodes the received control information and data, and outputs the decoded control information and data to the UL_PHY processor 250.

The UL_PHY processor 250 performs layer 1 processing on the control information and data received from the receiver 240, and outputs the processed control information and data to the RLC/MAC processor 210. The UL_PHY processor 250 further outputs the processed control information to the relay information detector 260.

The relay information detector 260 monitors the control information output from the UL_PHY processor 250 and detects relay information included in the control information. The relay information detector 260, upon detecting relay information, outputs the detected relay information to the ACK/NACK timing controller 270.

The ACK/NACK timing controller 270 controls the reception timing at which the delivery confirmation information is received from the ACK/NACK receiver 280. For example, the ACK/NACK timing controller 270 waits for a given period that starts at the transmission of the wireless signal by the eNB 200. When the given period elapses, the ACK/NACK timing controller 270 instructs the ACK/NACK receiver 280 that delivery confirmation information should be received.

The given period during which the ACK/NACK timing controller 270 waits, for example, is 4 sub-frames (a period of 4 transmissions of the wireless signal, which includes the PDCCH and the PDSCH), from the transmission of the wireless signal by the eNB 200. Upon receiving relay information from the relay information detector 260, the ACK/NACK timing controller 270 changes the reception timing of the delivery confirmation information that is for the wireless signal indicated in the relay information.

For example, the memory of the eNB 200 stores therein delay information that indicates the period of time that the wireless signal is delayed consequent to the regeneration and relay by the RN 100. The ACK/NACK timing controller 270 delays, by the period of time indicated in the delay information, the reception timing of the delivery confirmation information that is for the wireless signal indicated in the relay information. For example, the ACK/NACK timing controller 270 extends, by the period of time indicated in the delay information, the given period of waiting that starts when the wireless signal is transmitted by the eNB 200.

Upon being instructed, by the ACK/NACK timing controller 270, that delivery confirmation information should be received, the ACK/NACK receiver 280 receives delivery confirmation information included in the control information output from the UL_PHY processor 250. The ACK/NACK receiver 280 outputs the received delivery confirmation information to the RLC/MAC processor 210.

Figure 3:
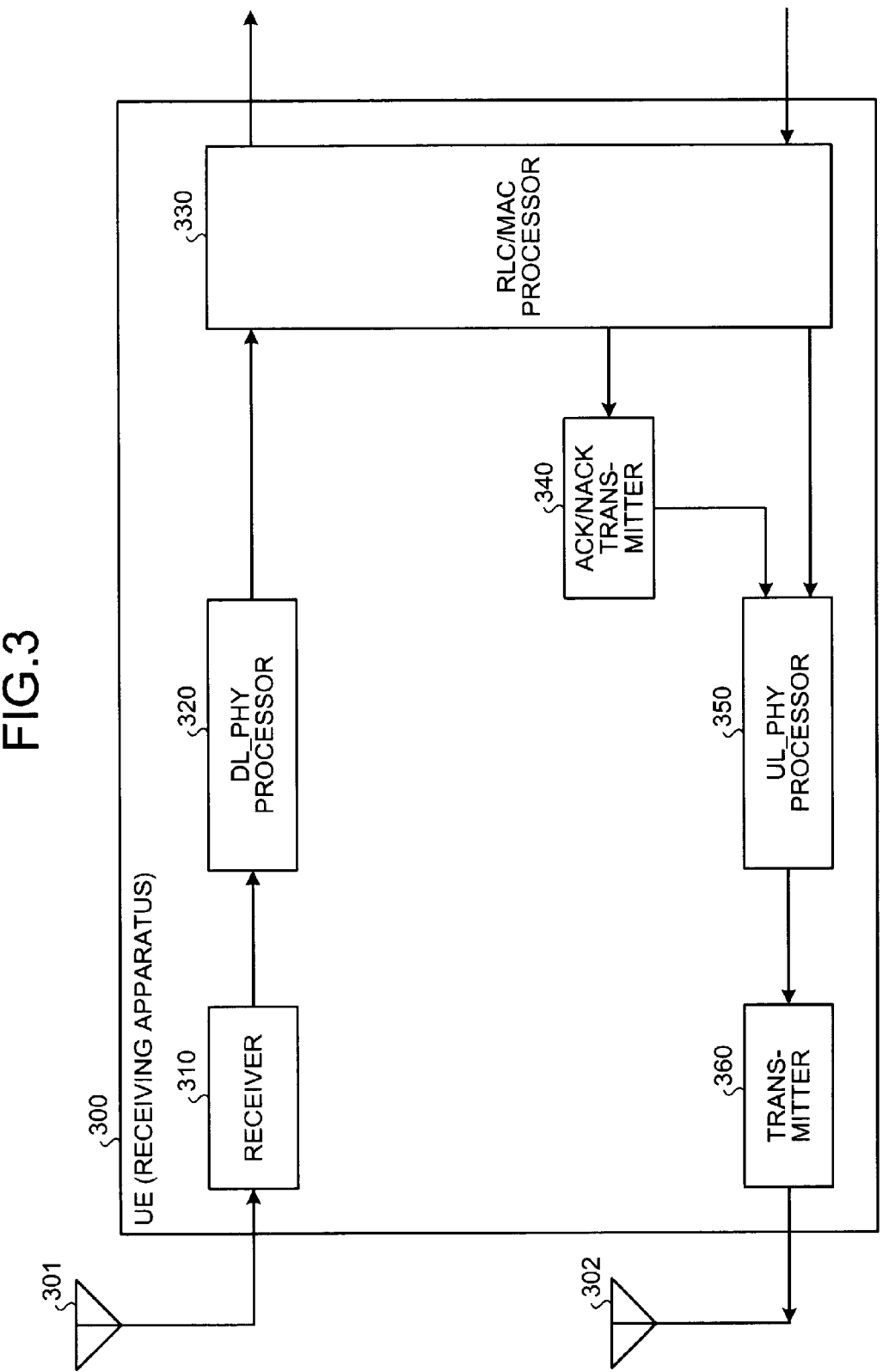
FIG. 3 is a block diagram of a UE according to the first embodiment.

FIG. 3 is a block diagram of the UE according to the first embodiment. The UE according to the first embodiment is a receiving apparatus that receives the wireless signal transmitted from the eNB 200 (refer to FIG. 2) and relayed by the RN 100 (refer to FIG. 1). As depicted in FIG. 3, a UE 300 according to the first embodiment includes a receiving antenna 301, a transmitting antenna 302, a receiver 310, a DL_PHY processor 320, an RLC/MAC processor 330, an ACK/NACK transmitter 340, a UL_PHY processor 350, and a transmitter 360.

The receiver 310 receives, via the receiving antenna 301, a wireless signal that is transmitted from the eNB 200, and regenerated and relayed by the RN 100. The wireless signal received by the receiver 310 includes PDCCH control information and PDSCH data. The receiver 310 decodes the received control information and data, and outputs the decoded control information and data to the DL_PHY processor 320. The DL_PHY processor 320 performs layer 1 processing on the control information and data received from the DL receiver 110, and outputs the processed control information and data to the RLC/MAC processor 330.

The RLC/MAC processor 330 performs layer 2 processing on the control information and data received from the DL_PHY processor 320. For example, the RLC/MAC processor 330 performs error determination with respect to layer 2 of the control information and data, and judges whether the wireless signal received by the receiver 310 has been properly decoded. The RLC/MAC processor 330 outputs a judgment result to the ACK/NACK transmitter 340.

The RLC/MAC processor 330 further outputs the layer 2 processed data to, for example, a higher level information processor. The RLC/MAC processor 330, for example, receives from a higher level information processor, uplink data addressed to the eNB 200. The RLC/MAC processor 330 performs layer 2 processing on the received data, and outputs the processed data as well as layer 2 control information to the UL_PHY processor 350.

The ACK/NACK transmitter 340, according to the judgment result received from the RLC/MAC processor 330, transmits the delivery confirmation information to the eNB 200. For example, if the judgment result output from the RLC/MAC processor 330 indicates that the wireless signal has been decoded properly, the ACK/NACK transmitter 340 outputs, as the delivery confirmation information, ACK to the UL_PHY processor 350. If the judgment result output from the RLC/MAC processor 330 indicates that the wireless signal has not been decoded properly, the ACK/NACK transmitter 340 outputs, as the delivery confirmation information, NACK to the UL_PHY processor 350.

The UL_PHY processor 350 performs layer 1 processing on the control information and data received from the RLC/MAC processor 330, outputs the processed control information and data to the transmitter 360. The UL_PHY processor 350 further assigns the delivery confirmation information (ACK or NACK) received from the ACK/NACK transmitter 340 to the PUCCH, and outputs the PUCCH assigned delivery confirmation information to the transmitter 360.

The transmitter 360 encodes relay information and data received from the UL_PHY processor 350 and transmits, via the transmitting antenna 302, the encoded relay information and data. The transmitter 360 further encodes the delivery confirmation information received from the UL_PHY processor 350 and transmits, via the transmitting antenna 302, the encoded delivery confirmation information. The relay information, data, and delivery confirmation information transmitted by the transmitter 360 are relayed by the RN 100 and received by the eNB 200.

Figure 4:
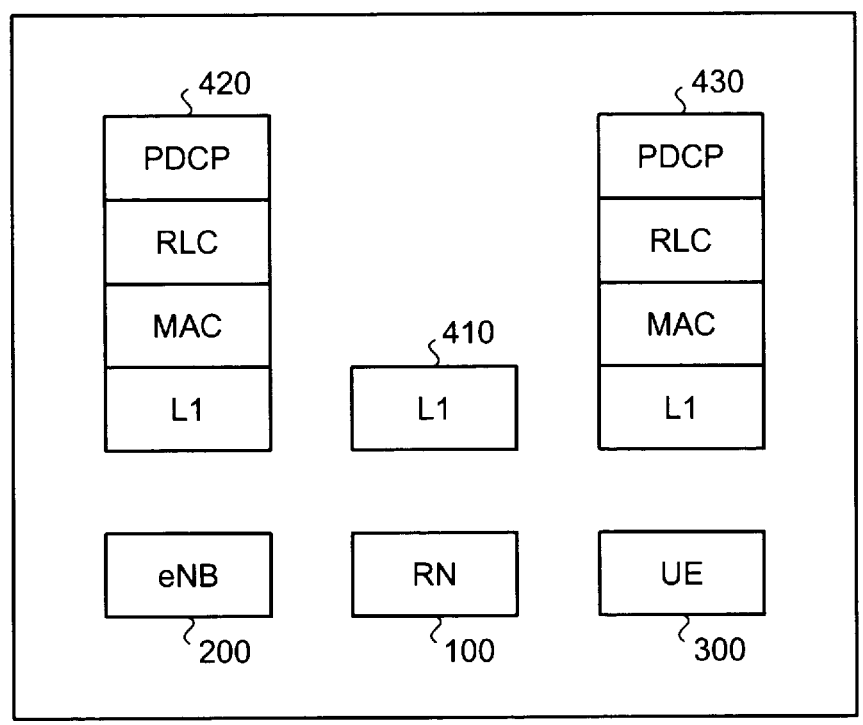
FIG. 4 is a diagram of a protocol stack for each communication apparatus.

FIG. 4 is a diagram of a protocol stack for each communication apparatus. A protocol stack 410 depicted in FIG. 4 depicts the protocol endpoint of the RN 100 (refer to FIG. 1). As depicted by the protocol stack 410, the RN 100 is an end point of layer 1 (L1), but not an end point of layer 2 or higher (MAC, RLC, and PDCP).

Protocol stack 420 depicts the protocol end points of the eNB 200 (refer to FIG. 2). As depicted by the protocol stack 420, the eNB 200 is an end point of layer 1 (L1) and of layer 2 (MAC, RLC, and PDCP). Protocol stack 430 depicts the protocol end points of the UE 300 (refer to FIG. 3). As depicted by the protocol stack 430, the UE 300 is an end point of layer 1 (L1) and of layer 2 (MAC, RLC, and PDCP).

Figure 5:
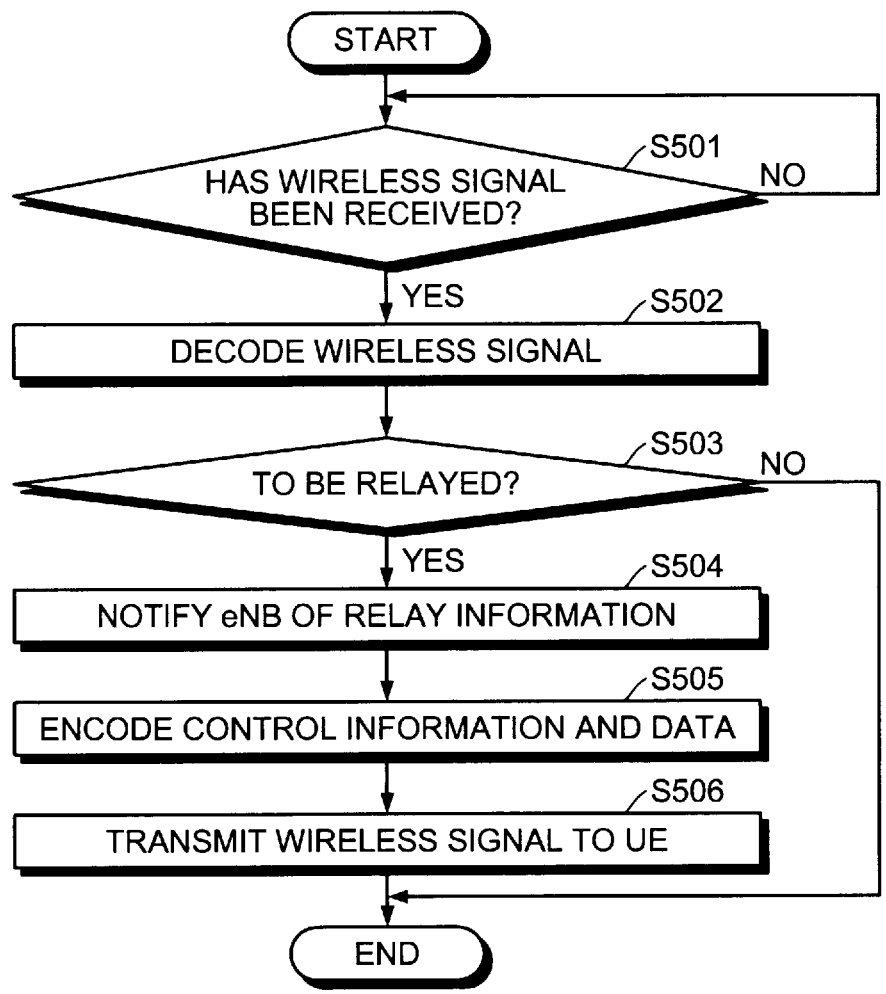
FIG. 5 is a flowchart of an example of operation of the RN according to the first embodiment.

FIG. 5 is a flowchart of an example of operation of the RN according to the first embodiment. As depicted in FIG. 5, the RN 100 determines whether a wireless signal transmitted by the eNB 200 has been received (step S501), and waits until a wireless signal is received (step S501: NO). When a wireless signal is received (step S501: YES), the RN 100 decodes the wireless signal (step S502).

The RN 100 determines whether the wireless signal received at step S501 is subject to relay (step S503). If the wireless signal is not to be relayed (step S503: NO), the series of operations ends. If the wireless signal is subject to relay (step S503: YES), the RN 100 notifies the eNB 200 of the relay information (step S504).

The RN 100 encodes the control information and data decoded at step S502 (step S505), and transmits the resulting encoded wireless signal to the UE 300 (step S506), ending the series of operations. By recursively performing the steps above, when the RN 100 receives a wireless signal that is subject to relay, the RN 100 is able to notify the eNB 200 that the wireless signal is to be regenerated and relayed, and is able to regenerate and relay the wireless signal.

Figure 6:
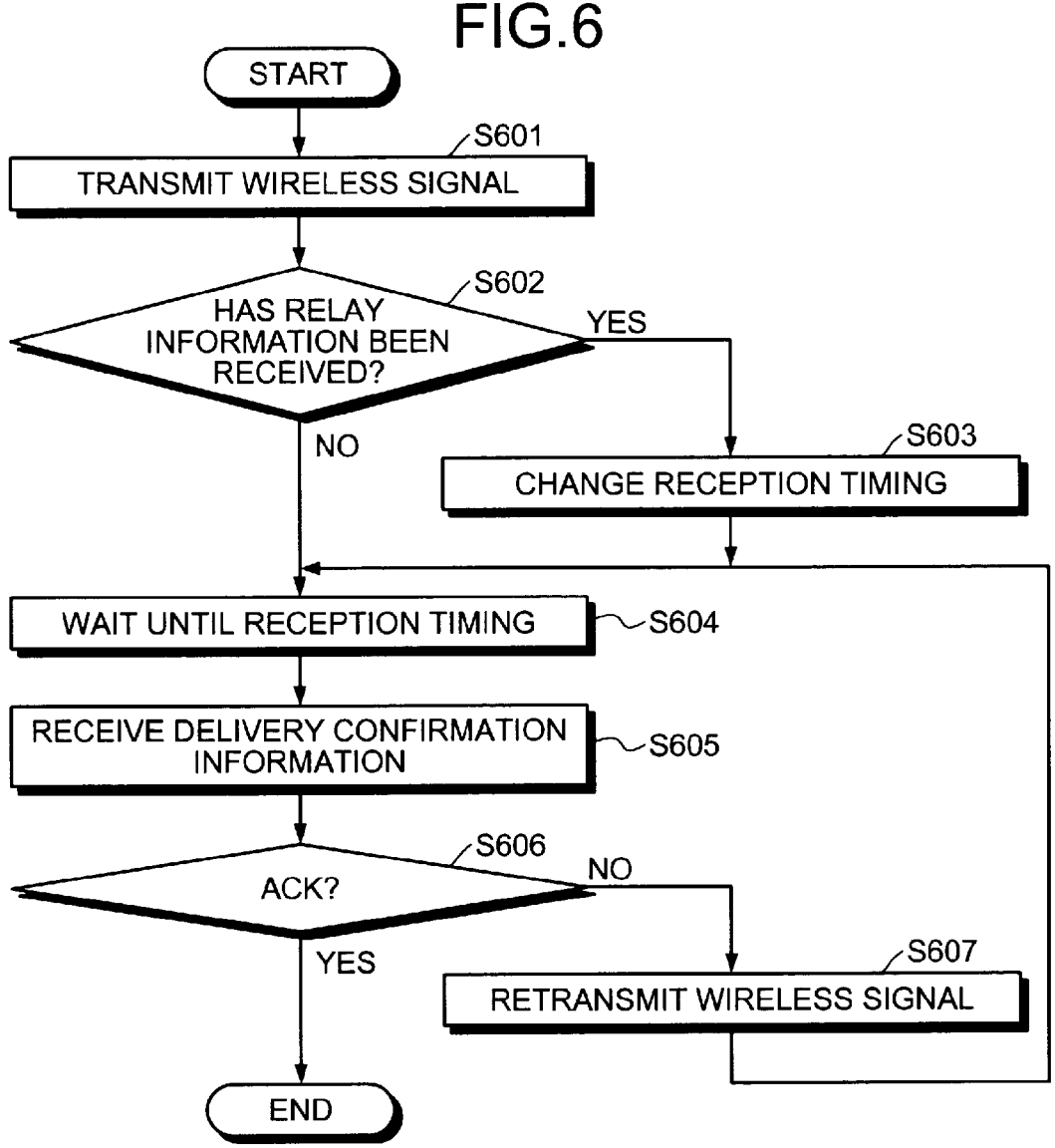
FIG. 6 is a flowchart of an example of operation of the eNB according to the first embodiment.

FIG. 6 is a flowchart of an example of operation of the eNB according to the first embodiment. As depicted in FIG. 6, the eNB 200 transmits a wireless signal (step S601). If the wireless signal transmitted at step S601 is addressed to the UE 300, the wireless signal is relayed by the RN 100 and received by the UE 300. If the wireless signal transmitted at step S601 is not addressed to the UE 300, the wireless signal is not necessarily relayed by the RN 100 or any other RN, and may be directly received by another UE.

The eNB 200 determines whether relay information has been received from the RN 100 (step S602). If relay information has not been received (step S602: NO), the eNB 200 proceeds to step S604 and continues therefrom. If relay information has been received (step S602: YES), the eNB 200 changes the reception timing of the delivery confirmation information that is for the wireless signal transmitted at step S601 (step S603).

The eNB 200 waits until the reception timing, which is at the elapse of a given period that starts after the transmission of the wireless signal at step S601 (step S604). The eNB 200 receives delivery confirmation information that is transmitted from a UE (e.g., the UE 300) and is for the wireless signal transmitted at step S601 (step S605). The eNB 200 determines whether the delivery confirmation information received at step S605 is ACK (step S606).

At step S606, if the delivery confirmation information is not ACK, but rather NACK (step S606: NO), the eNB 200 retransmits the wireless signal transmitted at step S601 (step S607), returns to step S604, and continues therefrom. If the eNB 200 returns to step S604 from step S607, at step S604, the eNB 200 waits for the elapse of the given period, from the retransmission of the wireless signal at step S607.

At step S606, if delivery confirmation information is ACK (step S606: YES), the series of operations ends. By performing each of the steps above for each input of downlink data, the eNB 200 is able to retransmit the wireless signal if NACK has been transmitted concerning the wireless signal. If the transmitted wireless signal is regenerated and relayed by the RN 100, the eNB 200 can adjust the reception timing of the delivery confirmation information, by the delay caused by the regeneration and relay.

Figure 7:
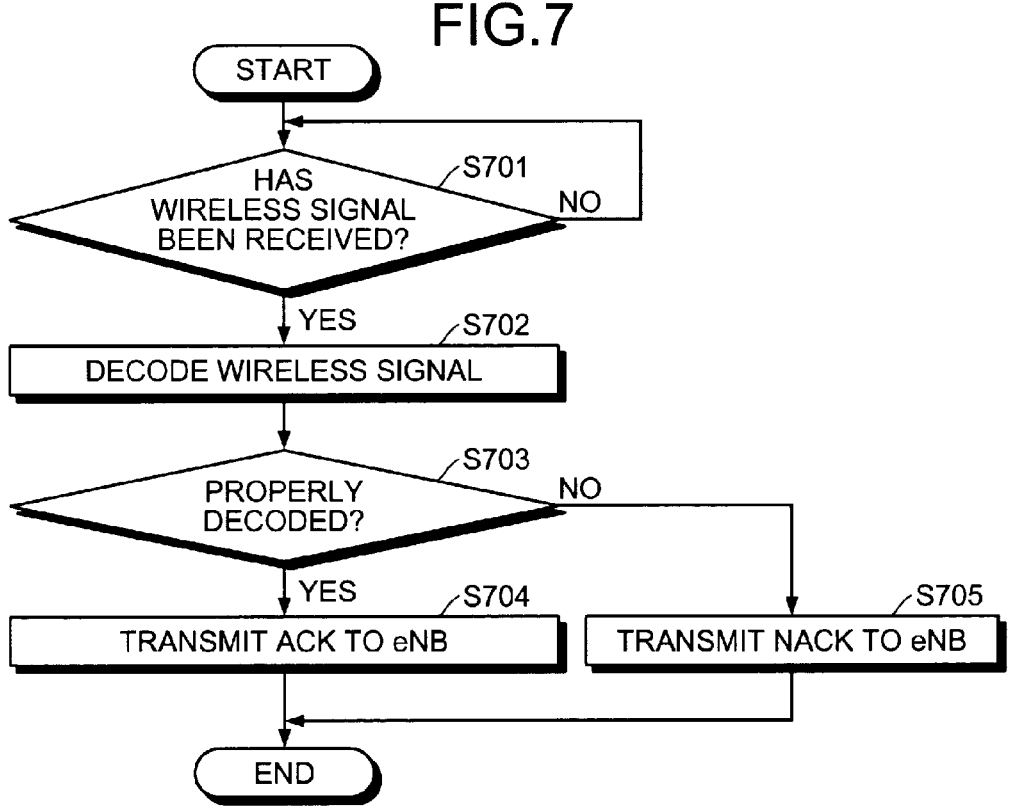
FIG. 7 is a flowchart of an example of operation of the UE according to the first embodiment.

FIG. 7 is a flowchart of an example of operation of the UE according to the first embodiment. As depicted in FIG. 7, the UE determines whether a wireless signal transmitted by the eNB 200 and to be relayed by the RN 100 has been received (step S701), and waits until a signal is received (step S701: NO). When a wireless signal is received (step S701: YES), the UE decodes the received wireless signal (step S702), and judges whether the wireless signal has been properly decoded (step S703).

At step S703, if the wireless signal has been properly decoded (step S703: YES), the UE transmits ACK, as delivery confirmation information, to the eNB 200 (step S704), ending the series of operations. If the wireless signal has not been properly decoded (step S703: NO), the UE transmits NACK, as delivery confirmation information, to the eNB 200 (step S705), ending the series of operations.

By recursively performing the above steps, when the wireless signal transmitted by the eNB 200 is properly decoded, the UE transmits ACK to the eNB 200 and when the wireless signal transmitted by the eNB 200 is not properly decoded, the UE transmits NACK to the eNB 200; thereby enabling a wireless signal that has been transmitted by the eNB 200 and that could not be properly decoded, to be again received from the eNB 200.

Figure 8:
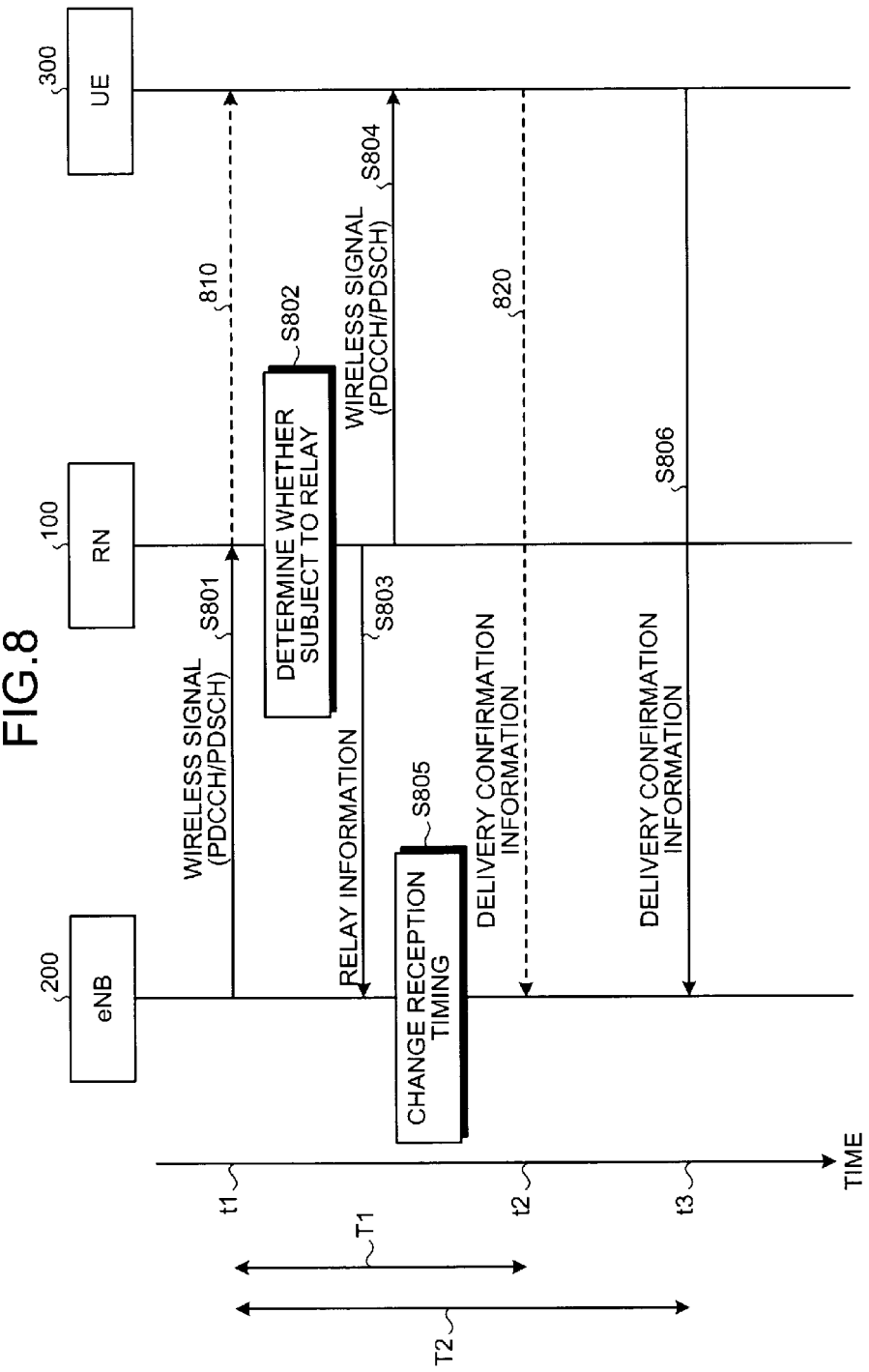
FIG. 8 is a sequence diagram of an operation example of a communication system according to the first embodiment.

FIG. 8 is a sequence diagram of an operation example of the communication system according to the first embodiment. In FIG. 8, the vertical axis represents time (similarly for sequence diagrams hereinafter). At timing t1, the eNB 200 transmits a downlink wireless signal addressed to the UE 300 (step S801). The wireless signal transmitted at step S801 includes PDCCH control information and PDSCH data. The wireless signal transmitted at step S801 is received by the RN 100.

The RN 100 determines whether the wireless signal transmitted at step S801 is subject to relay by the RN 100 (step S802). In this example, it is assumed that the wireless signal is subject to relay. Next, the RN 100 notifies the eNB 200 of relay information indicating that the wireless signal transmitted at step S801 is to be regenerated and relayed (step S803).

The RN 100 transmits to the UE 300, the wireless signal transmitted at step S801 (step S804). The eNB 200, based on the relay information notified at step S803, changes the reception timing of the delivery confirmation information concerning the wireless signal transmitted at step S801 (step S805).

Timing t2 indicates the reception timing of the delivery confirmation information before the change at step S805. Timing t3 indicates the reception timing of the delivery confirmation information after the change at step S805. The UE 300 transmits to the eNB 200 and via relay at the RN 100, the delivery confirmation information concerning the wireless signal transmitted at step S804 (step S806), ending the series of operations.

A dotted arrow 810 indicates, for reference, a case where the wireless signal transmitted by the eNB 200 is received directly by the E 300, without relay by the RN 100. In contrast, in the operation example depicted in FIG. 8, the wireless signal transmitted by the eNB 200 is relayed through the RN 100 and received by the UE 300. Consequently, compared to the case indicated by the dotted arrow 810, the delay of the wireless signal, in being received by the UE 300, increases by the period of delay consequent to the regeneration and relay by the RN 100.

Dotted arrow 820 represents the delivery confirmation information transmitted by the UE 300 in the case represented by the dotted arrow 810, where the wireless signal is received directly by the UE 300, without relay by the RN 100. Before step S805, the eNB 200 is set to be able to receive delivery confirmation information at the timing indicated by the dotted arrow 820 by having timing t2, which is the time when a given period T1 elapses from timing t1, set as the reception timing of the delivery confirmation information.

At step S805, the eNB 200 delays the reception timing of the delivery confirmation information by the period of delay consequent to the regeneration and relay by the RN 100. For example, the eNB 200 changes the reception timing of the delivery confirmation information to timing t3, which is the time when a given period T2 elapses from timing t1. The given period T2, for example, is a period that combines the given period T1 and the period that the wireless signal is delayed consequent to the regeneration and relay by the RN 100.

Consequently, the eNB 200 can substantially make the reception timing of the delivery confirmation information coincide with the timing of the transmission of the delivery confirmation information transmitted at step S805. By recursive execution of the steps above for each wireless signal transmitted by the eNB 200, the reception timing of the delivery confirmation information at the eNB 200 can be adjusted by the period of time that the wireless signal is delayed consequent to the regeneration and relay by the RN 100.

Figure 9:
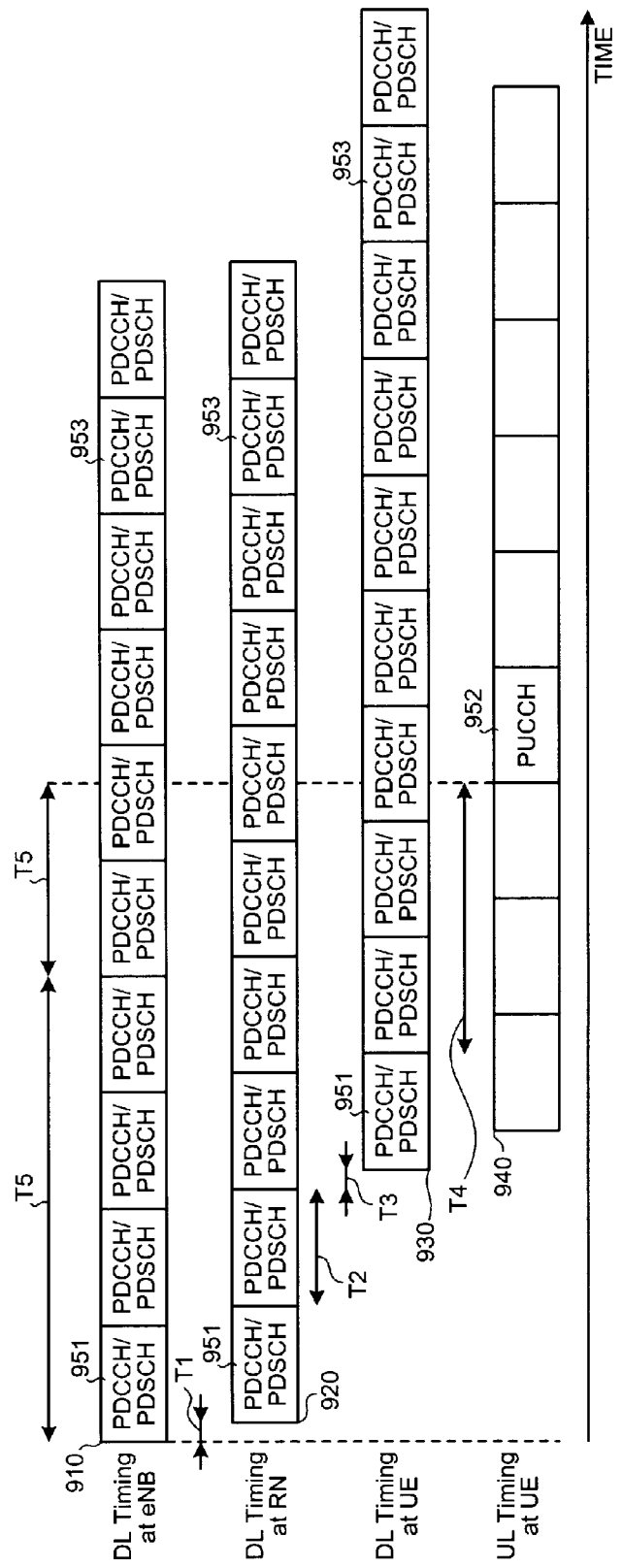
FIG. 9 is a timing chart of the operation example depicted in FIG. 8.

FIG. 9 is a timing chart of the operation example depicted in FIG. 8. In FIG. 9, the horizontal axis represents time. Line 910 (DL Timing at eNB) depicts the transmission timing of a wireless signal (PDCCH/PDSCH) by the eNB 200. Line 920 (DL Timing at RN) depicts the timing at which the RN 100 receives the wireless signal (PDCCH/PDSCH).

Line 930 (DL Timing at UE) depicts the timing at which the UE 300 receives the wireless signal (PDCCH/PDSCH) that has been regenerated and relayed by the RN 100. Line 940 (UL Timing at UE) depicts the timing at which the UE 300 transmits the delivery confirmation information (PUCCH).

Here, a wireless signal 951 depicted at the head of line 910 will be described. As depicted by line 920, the wireless signal 951 transmitted by the eNB 200 is received by the RN 100 after the elapse of period T1, which corresponds to the propagation delay between the eNB 200 and the RN 100.

As depicted by line 930, the wireless signal 951 received by the RN 100 is received by the UE 300 after the elapse of the period T2, which corresponds to the regeneration and relay processing period of the RN 100 and after the elapse of period T3, which corresponds to the transmission/propagation period delay between the RN 100 and the UE 300. As depicted by line 940, delivery confirmation information 952 concerning the wireless signal 951 is transmitted to the eNB 200 after the elapse of period T4, which corresponds to the processing period at the UE 300.

At the time of transmission of the wireless signal 951, the eNB 200 has the elapse of period T5, which corresponds to 4 sub-frames after the transmission of the wireless signal 951, set as the reception timing of the delivery confirmation information. Further, upon receiving relay information from the RN 100, the eNB 200 sets, as the reception timing of the delivery confirmation information, the elapse of period T5 and of period T6, which corresponds to period T2, etc. Consequently, the delivery confirmation information 952 can be received with highly precise timing.

For example, if the delivery confirmation information is NACK, the eNB 200 transmits the wireless signal 953, which is the same as the wireless signal 951. The wireless signal transmitted by the eNB 200 is regenerated and relayed by the RN 100, and received by the UE 300. In this manner, since the timing of the reception of the delivery confirmation information 952 is highly precise, retransmission control, in which the wireless signal 953 that is the same as the wireless signal 951 is transmitted when the wireless signal 951 is not properly transmitted, can be stabilized.

In this manner, according to the first embodiment, relay information indicating that the wireless signal transmitted by the eNB 200 is subject to regeneration and relay by the RN 100, is transmitted to the eNB 200. As a result, at the eNB 200, the reception timing of the delivery confirmation information can be adjusted by the period that the wireless signal is delayed consequent to the regeneration and relay by the RN 100. Consequently, even if regeneration and relay is performed by the RN 100, the eNB 200 can receive the delivery confirmation information with highly precise timing. Therefore, stabilized control of wireless signal retransmission can be performed.

Further, by transmitting the relay information from the RN 100 to the eNB 200, the wireless signal to be regenerated and relayed by the RN 100 is identified by the eNB 200 and the reception timing of the delivery confirmation information concerning the identified wireless signal is adjusted. Consequently, for wireless signals that are not regenerated or relayed by the RN 100, the eNB 200 is able to receive the delivery confirmation information with highly precise timing, without delaying the reception timing of the delivery confirmation information.

Therefore, for example, compared to a case where the timing at which the delivery confirmation information is received, is delayed for all wireless signals, retransmission control for delay is kept to a minimum and the delivery confirmation information concerning the wireless signal regenerated and relayed by the RN 100 can be received with highly precise timing. Further, since retransmission control can be stabilized without the use of a high speed processing circuit in the eNB 200 or the UE 300, the cost of the eNB 200 and the UE 300 can be reduced.

When the eNB 200 according to the first embodiment receives relay information indicating that a wireless signal addressed to the UE 300 is to be regenerated and relayed, the eNB 200 adjusts the reception timing of the delivery confirmation information. Consequently, even if the wireless signal is delayed consequent to the regeneration and relay by the RN 100, and the delivery confirmation information transmitted by the UE 300 is delayed, the delivery confirmation information can be received with highly precise timing.

Further, by receiving relay information, the eNB 200 identifies a wireless signal that is to be regenerated and relayed by the RN 100 and can adjust the reception timing of the delivery confirmation information concerning the identified wireless signal. Consequently, for wireless signals that are not regenerated or relayed by the RN 100, the eNB 200 can receive the delivery confirmation information with highly precise timing, without delaying the reception timing of the delivery confirmation information.

Figure 10:
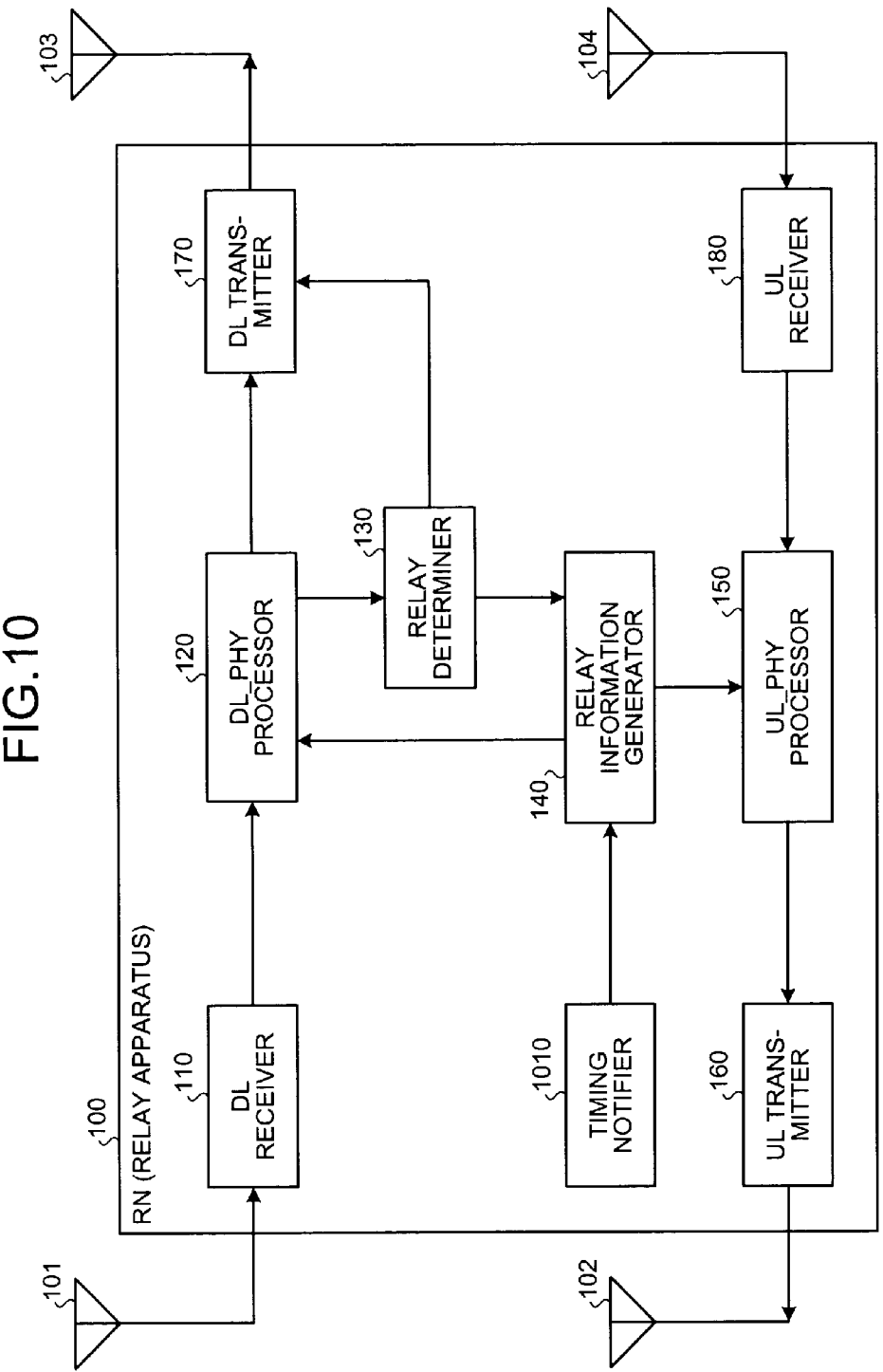
FIG. 10 is a block diagram of the RN according to a second embodiment.

FIG. 10 is a block diagram of the RN according to a second embodiment. In FIG. 10, components identical to those depicted in FIG. 1 are given the same reference numerals used in FIG. 1 and description thereof is omitted. As depicted in FIG. 10, the RN 100 according to the second embodiment includes a timing notifier 1010 in addition to the configuration depicted in FIG. 1. The timing notifier 1010, for example, acquires the reception timing for the eNB 200, from timing information periodically transmitted by the eNB 200. The timing notifier 1010 notifies the relay information generator 140 of the reception timing for the eNB 200.

When determination results indicating that the wireless signal is to be regenerated and relayed by the RN 100, are received from the relay determiner 130, the relay information generator 140 generates relay information and outputs the generated relay information to the DL_PHY processor 120. Further, when determination results indicating that the wireless signal is to be regenerated and relayed by the RN 100, are received from the relay determiner 130, the relay information generator 140 outputs the relay information to the DL_PHY processor 120, at the timing notified by the timing notifier 1010.

The DL_PHY processor 120 assigns to the PDCCH, the relay information received from the relay information generator 140 and outputs the PDCCH assigned relay information to the DL transmitter 170. The DL transmitter 170 transmits, via the DL transmitting antenna 103 and to the UE 300, the relay information received from the DL_PHY processor 120.

The configuration of the eNB 200 according to the second embodiment is identical to that depicted in FIG. 2 and description thereof is omitted. However, if relay information is detected by the relay information detector 260, the RLC/MAC processor 210 again outputs to the DL_PHY processor 220, the control information and data of the wireless signal indicated in the relay information. In this case, the ACK/NACK timing controller 270 waits for a given period after the wireless signal is retransmitted by the eNB 200 and extends the given period for waiting, by the period of time indicated in the delay information.

Figure 11:
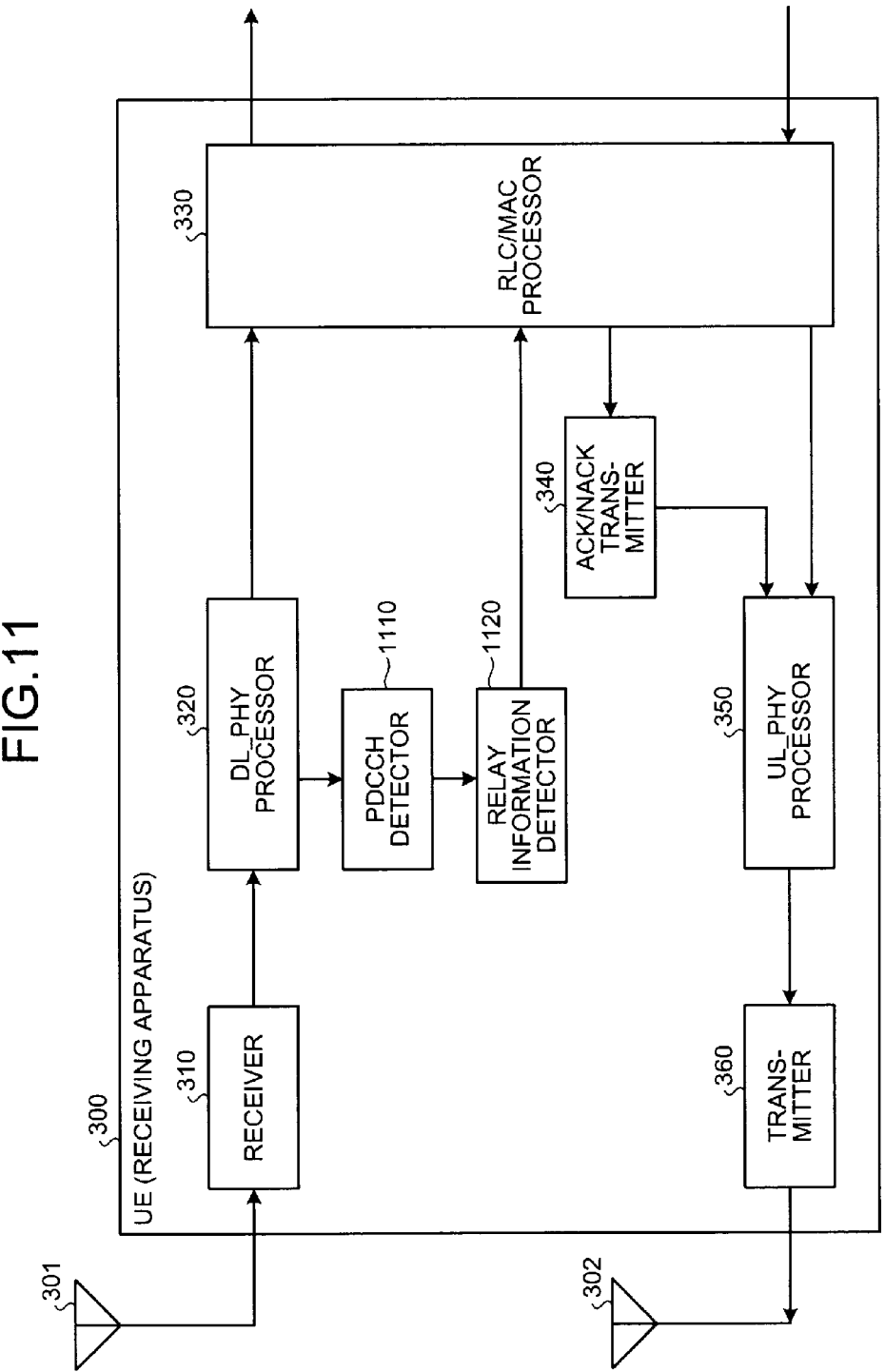
FIG. 11 is a block diagram of the UE according to the second embodiment.

FIG. 11 is a block diagram of the UE according to the second embodiment. In FIG. 11, components identical to those depicted in FIG. 3 are given the same reference numerals used in FIG. 3 and description thereof is omitted. As depicted in FIG. 11, the UE 300 according to the second embodiment includes a PDCCH detector 1110 and a relay information detector 1120 in addition to the configuration depicted in FIG. 3.

The DL_PHY processor 320 outputs to the PDCCH detector 1110, the control information and data received from the receiver 310. The PDCCH detector 1110 detects PDCCH control information among the control information and data received from the DL_PHY processor 320. The PDCCH detector 1110 outputs the detected control information to the relay information detector 1120.

The relay information detector 1120 detects relay information included in the control information received from the PDCCH detector 1110. The relay information detector 1120, upon detecting relay information outputs the detected relay information to the RLC/MAC processor 330. When the relay information is output from the relay information detector 1120, the RLC/MAC processor 330 discards the control information and data concerning the wireless signal indicated in the relay information. In this case, configuration may be such that the ACK/NACK transmitter 340 does not transmit the deliver confirmation information concerning the wireless signal indicated in the relay information.

Figure 12:
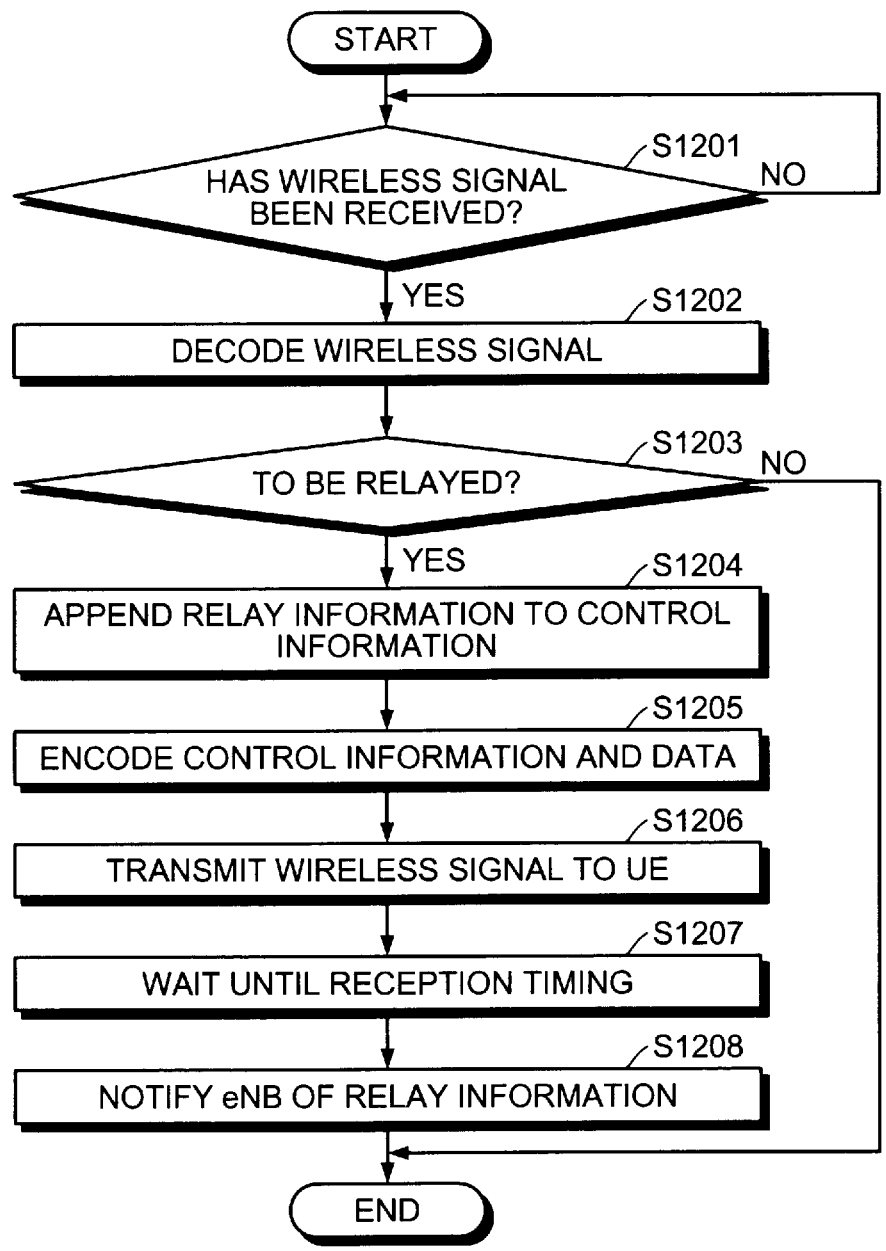
FIG. 12 is a flowchart of an example of operation of the RN according to the second embodiment.

FIG. 12 is a flowchart of an example of operation of the RN according to the second embodiment. Steps S1201-S1203 depicted in FIG. 12 are identical to steps S501-S503 depicted in FIG. 5 and description thereof is omitted. At step S1203, if the wireless signal is subject to relay (step S1203: YES), relay information is appended to the control information decoded at step S1202 (step S1204).

At step S1204, the DL_PHY processor 120 assigns the relay information to the PDCCH. The DL_PHY processor 120 encodes the control information that has been appended with the relay information at step S1204 and encodes the data decoded at step S1202 (step S1205); and transmits the resulting encoded wireless signal to the UE 300 (step S1206).

The RN 100 waits until the reception timing of the delivery confirmation information at the eNB 200 (step S1207); and notifies the eNB 200 of the relay information (step S1208), ending the series of operations. By recursively performing the steps above, when the RN 100 receives a wireless signal that is subject to relay, the RN 100 is able to transmit the wireless signal together with relay information to the UE 300. Further, at the reception timing of the delivery confirmation information at the eNB 200, the eNB 200 can be notified that wireless signal is to be regenerated and relayed.

Figure 13:
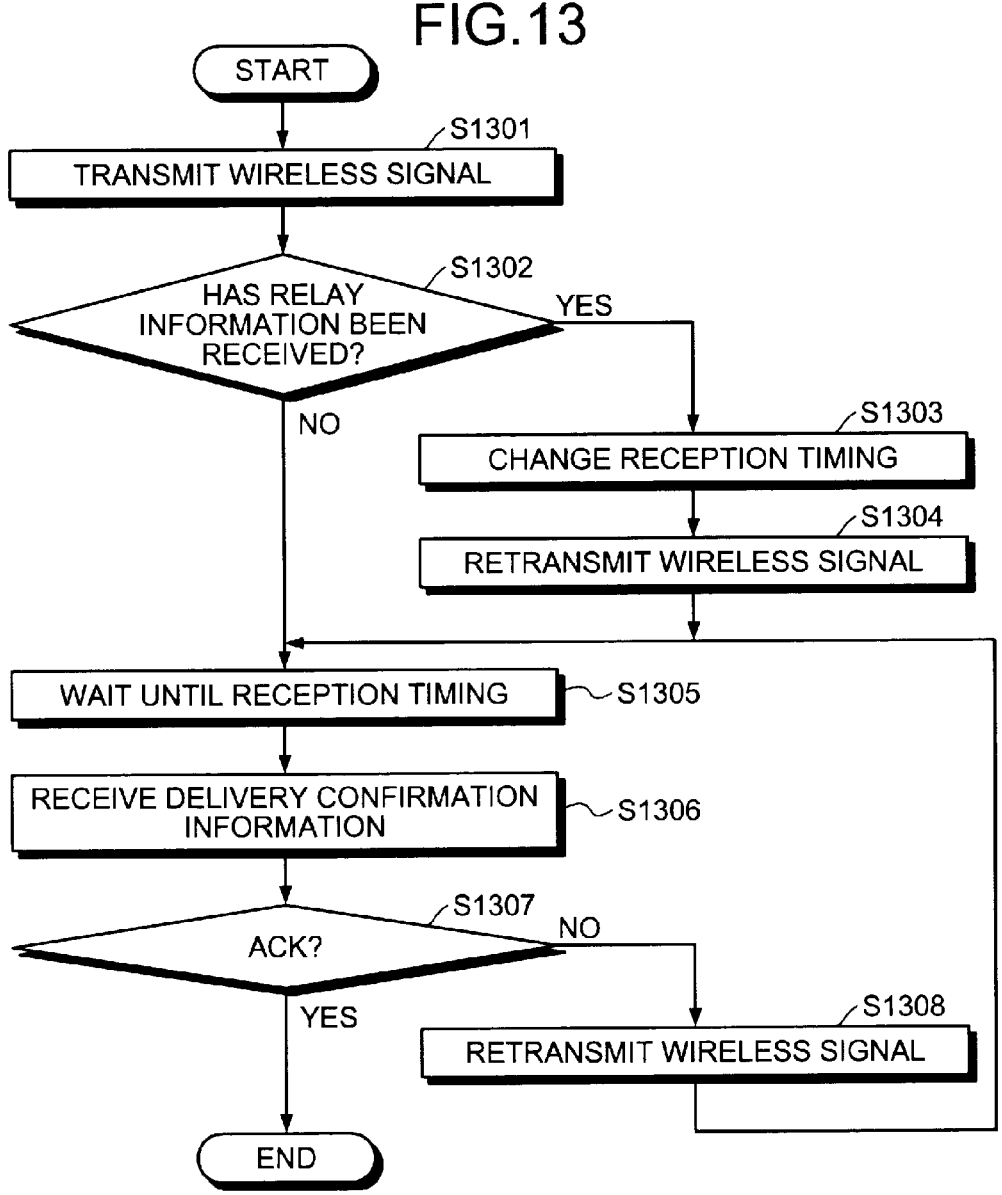
FIG. 13 is a flowchart of an example of operation of the eNB according to the second embodiment.

FIG. 13 is a flowchart of an example of operation of the eNB according to the second embodiment. Steps S1301-S1303 depicted in FIG. 13 are identical to steps S601-S603 depicted in FIG. 6 and description thereof is omitted. After changing the reception timing of the delivery confirmation information step S1303, the eNB 200 again transmits the wireless signal transmitted at step S1301 (step S1304), and proceeds to step S1305.

If the eNB 200 transitions from step S1304 to step S1305, at step S1305, the eNB 200 waits until the reception timing, which is when the given period has elapsed, from the time that the wireless signal was transmitted at step S1304. In this case, the reception timing is the reception timing that results from the change at step S1303. Steps S1306-S1308 depicted in FIG. 13 are identical to steps S605-S607 depicted in FIG. 6 and description thereof is omitted.

By an execution of the above steps for each input of downlink data, if NACK is transmitted with respect to a wireless signal, the wireless signal can be retransmitted. Further, if a transmitted signal is to be regenerated and relayed by the RN 100, the reception timing of the delivery confirmation information can be adjusted by the period of delay caused by the regeneration and relay; and the wireless signal can be retransmitted. Consequently, the delivery confirmation information concerning subsequent wireless signals addressed to the UE 300 can be received at a reception timing that has been adjusted by the period of delay consequent to the regeneration and relay by the RN 100.

Figure 14:
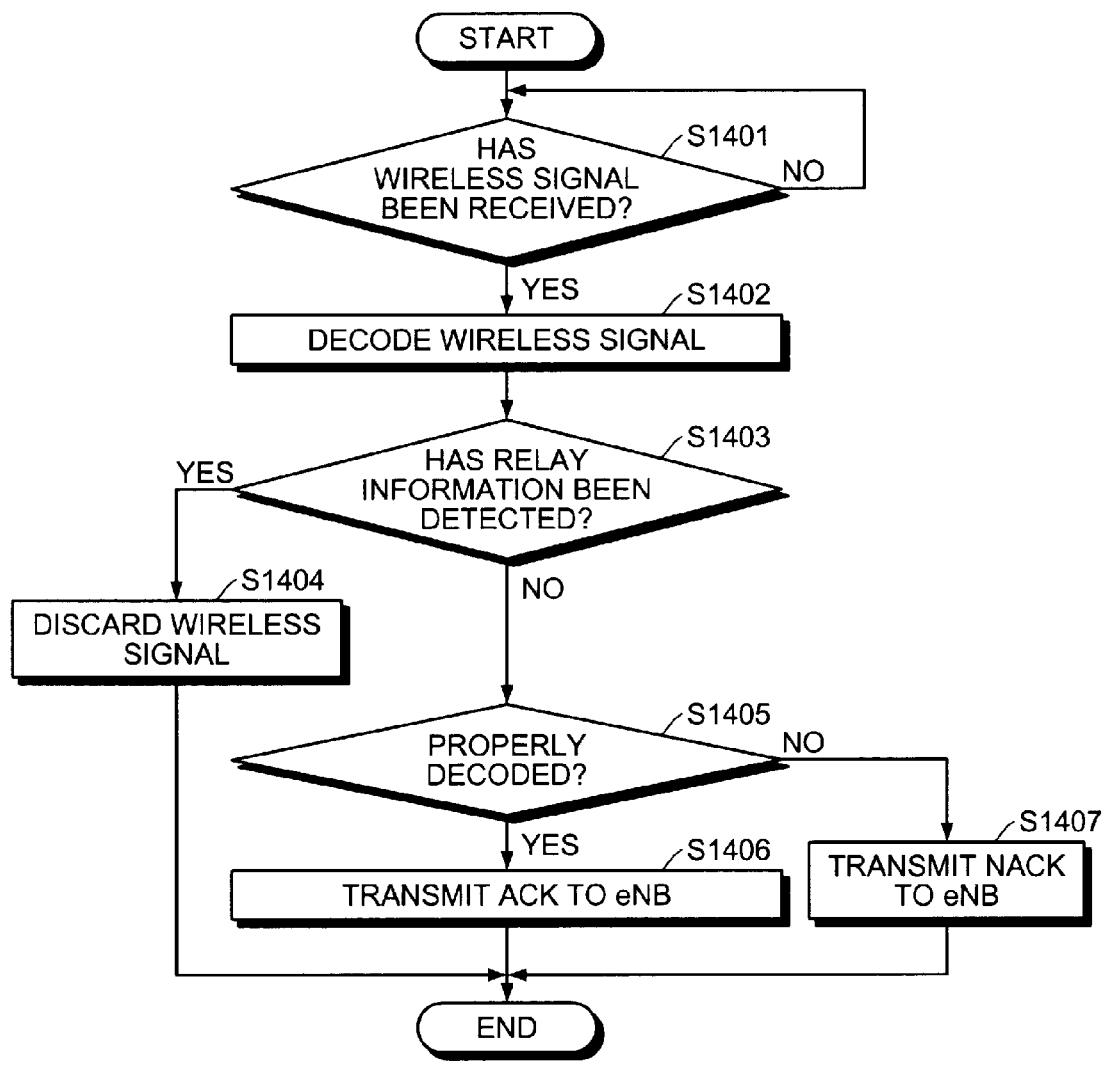
FIG. 14 is a flowchart of an example of operation of the UE according to the second embodiment.

FIG. 14 is a flowchart of an example of operation of the UE according to the second embodiment. Steps S1401, S1402 depicted in FIG. 14 are identical to steps S701, S702 depicted in FIG. 7 and description thereof is omitted. After the wireless signal is decoded at step S1402, the UE 300 determines whether relay information has been detected from the control information decoded at step S1402 (step S1403).

At step S1403, if relay information has been detected (step S1403: YES), the UE 300 discards the wireless signal received at step S1401 (step S1404), ending the series of operations. If relay information has not been detected (step S1403: NO), the UE 300 proceeds to step S1405. Steps S1405-S1407 depicted in FIG. 14 are identical to steps S703-S705 depicted in FIG. 7 and description thereof is omitted.

By recursively performing the steps above, if the wireless signal transmitted by the eNB 200 is properly decoded, the UE 300 transmits ACK to the eNB 200; and if the wireless signal transmitted by the eNB 200 cannot be properly decoded, the UE 300 transmits NACK to the eNB 200. Further, if relay information is received from the RN 100, the UE 300 discards the wireless signal and waits for retransmission of the wireless signal, without transmitting the delivery confirmation information.

Figure 15:
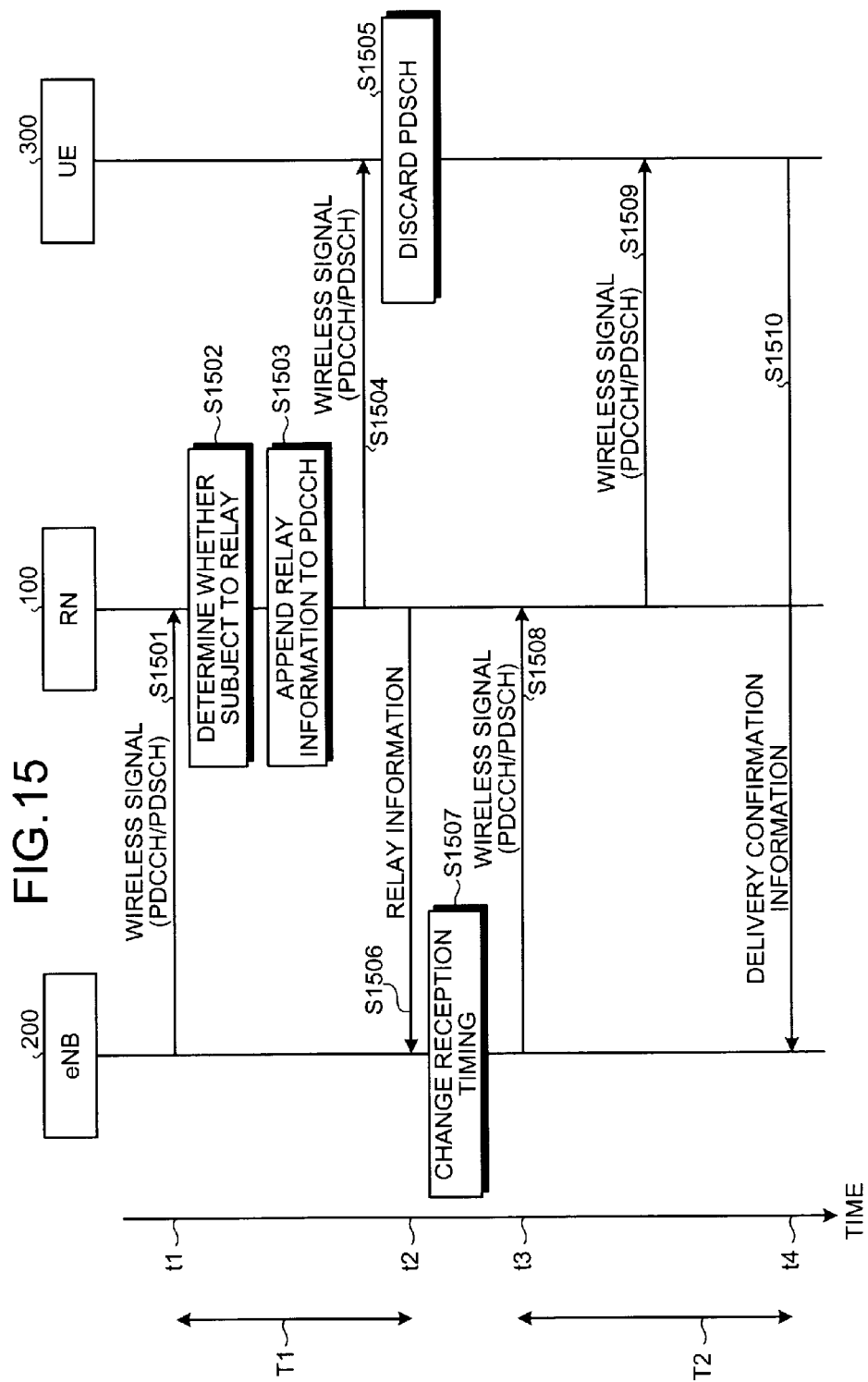
FIG. 15 is a sequence diagram of an operation example of the communication system according to the second embodiment.

FIG. 15 is a sequence diagram of an operation example of the communication system according to the second embodiment. Steps S1501, S1502 depicted in FIG. 15 are identical to steps S801, S802 depicted in FIG. 8 and description thereof is omitted. At step S1502, after it has been determined that the wireless signal is subject to relay, the RN 100 appends relay information to the PDCCH of the wireless signal transmitted at step S1501 (step S1503).

The RN 100 transmits to the UE 300, the wireless signal to which relay information was appended step S1503 (step S1504). The UE 300 discards the PDSCH of wireless signal transmitted at step S1504 (step S1505). The RN 100, at timing t2, which is the reception timing before the change at step S1507, notifies the eNB 200 of relay information that indicates that the wireless signal transmitted at step S1501 is to be regenerated and relayed (step S1506).

The eNB 200, based on the relay information notified at step S1506, changes the reception timing of the delivery confirmation information concerning the wireless signal (step S1507). The eNB 200 retransmits the wireless signal transmitted at step S1501 (step S1508). The RN 100 regenerates and relays the wireless signal transmitted at step S1508 (step S1509).

The UE 300 transmits to the eNB 200 and by relay of the RN 100, the delivery confirmation information concerning the wireless signal transmitted at step S1509 (step S1510), ending the series of operations. In the operation depicted in FIG. 15, since the wireless signal is again transmitted to the UE 300, configuration may be such that at step S1504, the PDCCH is transmitted and the PDSCH is not. In this case, step S1505 can be omitted.

The eNB 200, before step S1507, is set having timing t2, as the reception timing of the delivery confirmation information. Timing t2 is the time when the given period T1 elapses from timing t1. The eNB 200, at step S1507, changes the reception timing of the delivery confirmation information to timing t4, which is when a given period T2 elapses from timing t3 when the wireless signal is retransmitted. The given period T2, for example, is a period combining the given period T1 and the period of time that the wireless signal is delayed consequent to the regeneration and relay by the RN 100.

Consequently, the eNB 200 can make the reception timing of the delivery confirmation information substantially coincide with the timing that the delivery confirmation information is transmitted at step S1510. By performing the steps above for each wireless signal transmitted, the eNB 200 can adjust the reception timing of the delivery confirmation information at the eNB 200, by the period of time that the wireless signal is delayed consequent to the regeneration and relay by the RN 100.

In this manner, if relay information is received, the eNB 200 according to the second embodiment retransmits the wireless signal indicated in the relay information and receives the delivery confirmation information concerning the wireless signal, at a reception timing when a given period starting after the retransmission of the wireless signal elapses. Consequently, the same effects achieved by the first embodiment can be achieved.

In the second embodiment, although a configuration is described where the RN 100 transmits relay information to the eNB 200, configuration may be such that the RN 100 transmits to the eNB 200, delivery confirmation information together with the relay information. For example, the RN 100 transmits to the eNB 200, NACK as the delivery confirmation information and stores the relay information to the NACK transmitted. Consequently, the relay information can be transmitted without newly adding a control channel.

Figure 16:
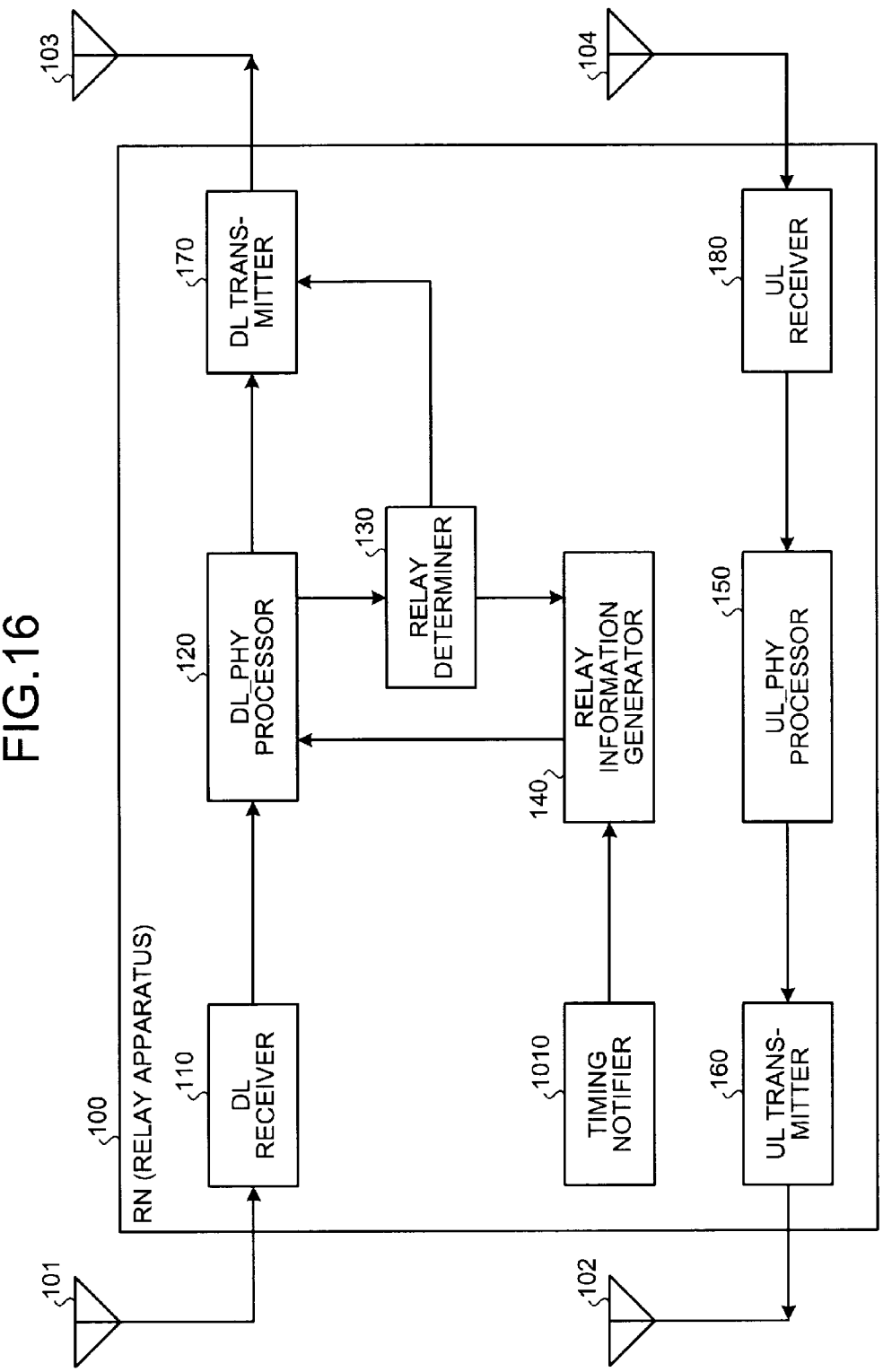
FIG. 16 is a block diagram of the RN according to a third embodiment.

FIG. 16 is a block diagram of the RN according to a third embodiment. In FIG. 16, components identical to those depicted in FIG. 10 are given the same reference numerals used in FIG. 10 and description thereof is omitted. As depicted in FIG. 16, the relay information generator 140 of the RN 100 according to the third embodiment may be configured to not output the generated relay information to the UL_PHY processor 150. Configuration of the eNB 200 according to the third embodiment is identical to the configuration depicted in FIG. 2 and thus, description is omitted herein.

Figure 17:
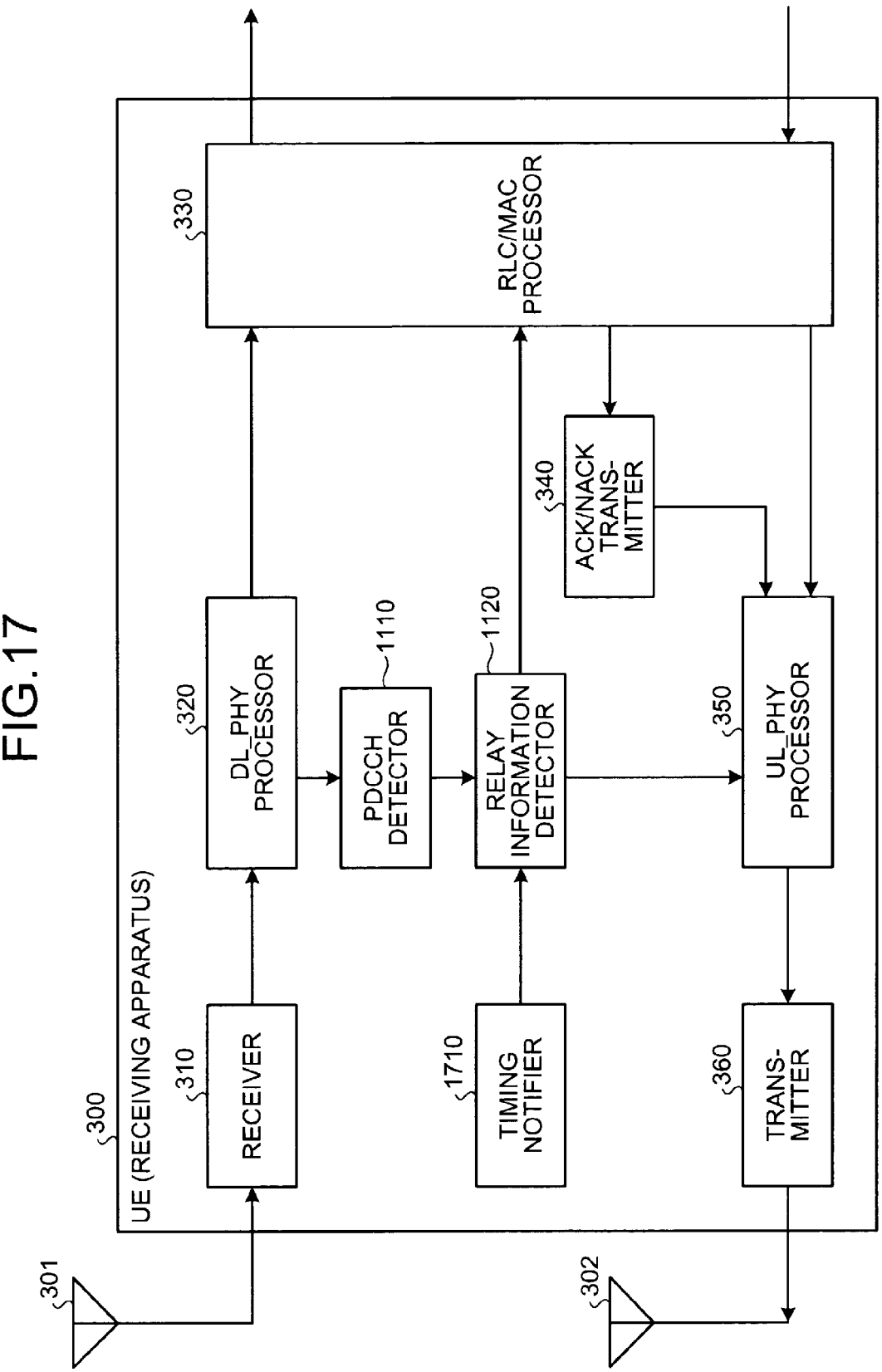
FIG. 17 is a block diagram of the UE according to the third embodiment.

FIG. 17 is a block diagram of the UE according to the third embodiment. In FIG. 17, components identical to those depicted in FIG. 11 are given the same reference numerals used in FIG. 11 and description thereof is omitted. As depicted in FIG. 17, the UE 300 according to the third embodiment includes a timing notifier 1710 in addition to the configuration depicted in FIG. 11.

The timing notifier 1710, for example, extracts the reception timing for the eNB 200, from timing information periodically output from the eNB 200. The timing notifier 1710 notifies the relay information detector 1120 of the reception timing for the eNB 200. The relay information detector 1120, upon detecting relay information, outputs the relay information to the UL_PHY processor 350, at the timing notified by the timing notifier 1710.

The UL_PHY processor 350 assigns to the PUCCH, the relay information received from the relay information detector 1120 and outputs the PUCCH assigned relay information to the transmitter 360. The transmitter 360 transmits, via the transmitting antenna 302, the relay information received from the UL_PHY processor 350. The relay information transmitted by the transmitter 360 is relayed by the RN 100 and transmitted to the eNB 200.

Figure 18:
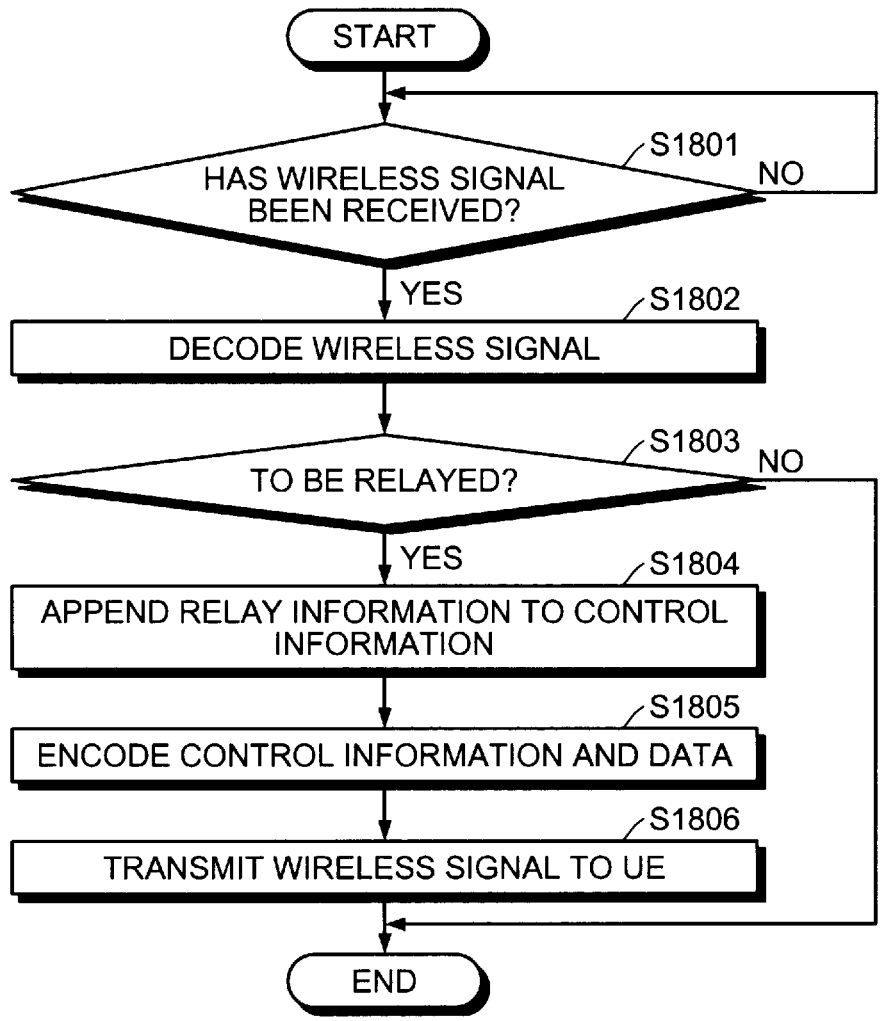
FIG. 18 is a flowchart of an example of operation of the RN according to the third embodiment.

FIG. 18 is a flowchart of an example of operation of the RN according to the third embodiment. Steps S1801-S1806 depicted in FIG. 18 are identical to steps S1201-S1206 depicted in FIG. 12 and description thereof is omitted. As depicted in FIG. 18, in the third embodiment, steps S1207, S1208 depicted in FIG. 12 may be omitted. By recursive execution of the above steps, when a wireless signal that is subject to relay by the RN 100 is received, the wireless signal together with the relay information can be transmitted to the UE 300. Operation of the eNB 200 according to the third embodiment is identical to the operation depicted in FIG. 13 and description thereof is omitted.

Figure 19:
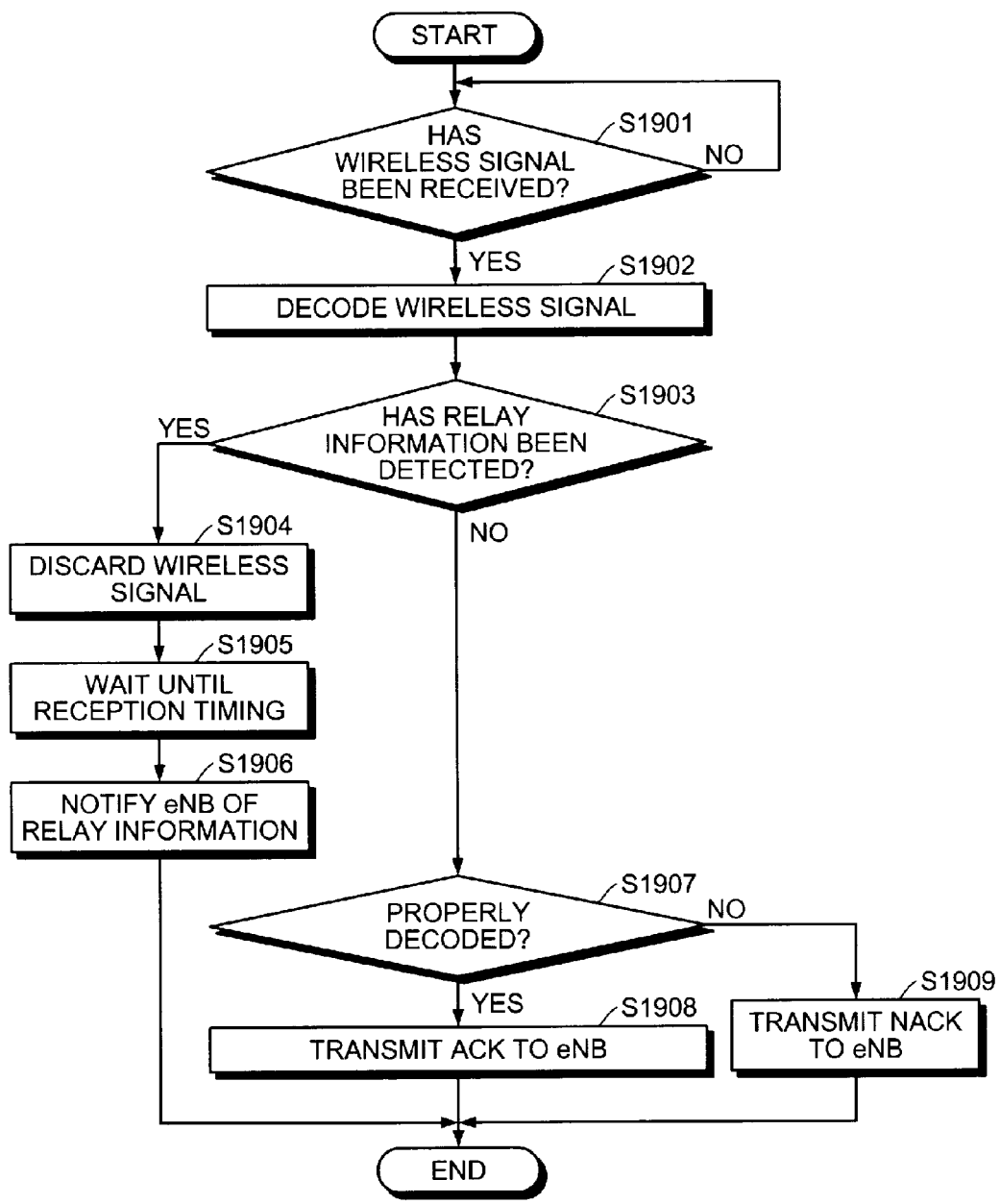
FIG. 19 is a flowchart of an example of operation of the UE according to the third embodiment.

FIG. 19 is a flowchart of an example of operation of the UE according to the third embodiment. Steps S1901-S1904 depicted in FIG. 19 are identical to steps S1401-S1404 depicted in FIG. 14 and description thereof is omitted. After discarding the wireless signal at step S1904, the UE 300 waits until the reception timing for the delivery confirmation information at the eNB 200 (step S1905).

The UE 300 outputs to the eNB 200, the relay information detected at step S1903 (step S1906). The relay information transmitted at step S1906 is relayed by the RN 100 and received by the eNB 200. Steps S1907-S1909 depicted in FIG. 19 are identical to steps S1405-S1407 depicted in FIG. 14 and description thereof is omitted.

By recursively performing the above steps, if the wireless signal transmitted by the eNB 200 is properly decoded, the UE 300 transmits ACK to the eNB 200; and if the wireless signal transmitted by the eNB 200 is not properly decoded, the UE 300 transmits NACK to the eNB 200. Further, if relay information is received from the RN 100, the UE 300 discards the wireless signal and transmits the relay information to the eNB 200.

Figure 20:
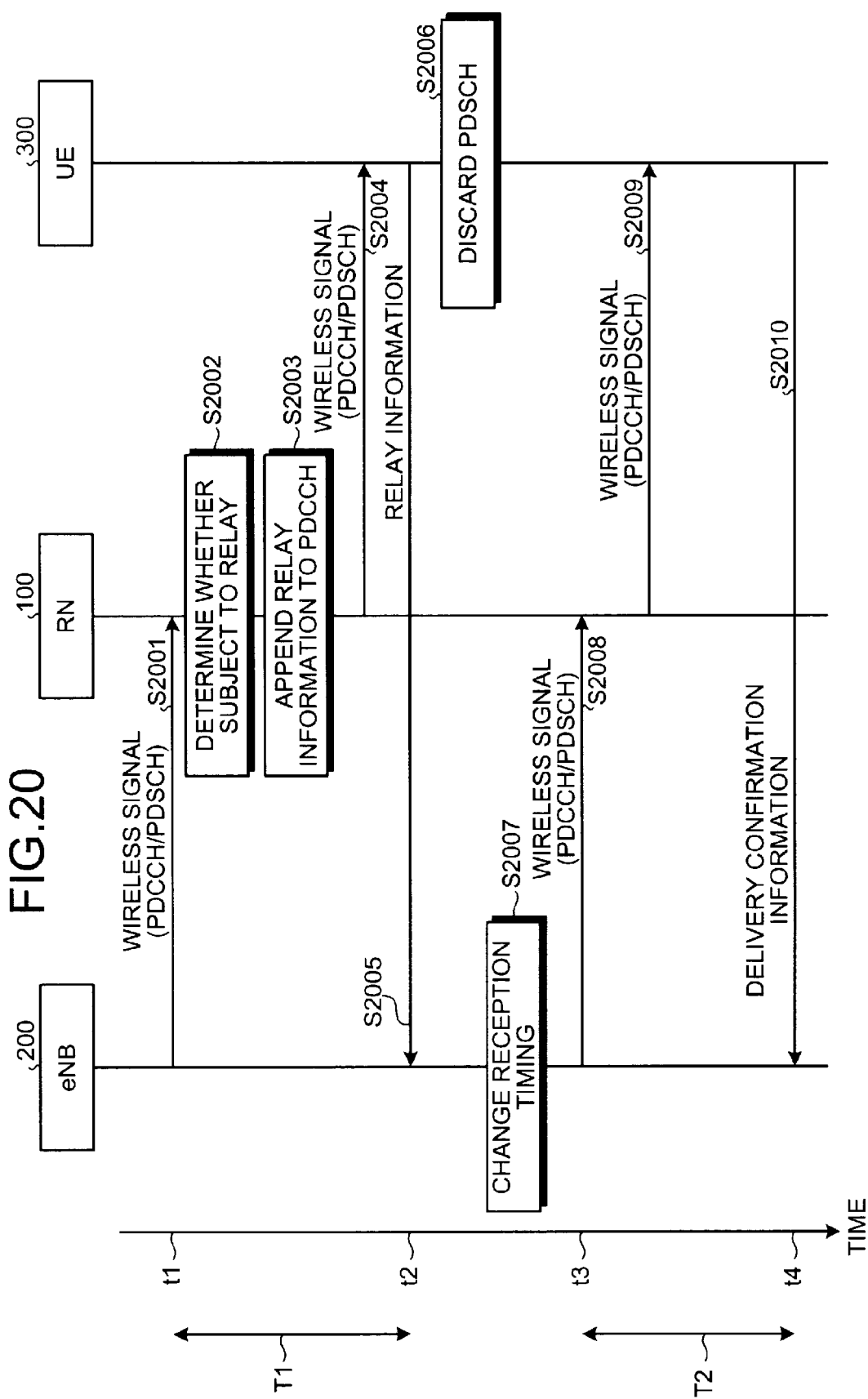
FIG. 20 is a sequence diagram of an example of operation of the communication system according to the third embodiment.

FIG. 20 is a sequence diagram of an example of operation of the communication system according to the third embodiment. Steps S2001-S2004 depicted in FIG. 20 are identical to steps S1501-S1504 depicted in FIG. 15 and description thereof is omitted. After step S2004, at timing t2, which is the reception timing before the change at step S2007, the UE 300 transmits the relay information to the eNB 200 (step S2005).

The UE 300 discards the PDSCH of the wireless signal transmitted at step S2004 (step S2006). The eNB 200, based on the relay information transmitted at step S2005, changes the reception timing of the delivery confirmation information concerning the wireless signal (step S2007). Steps S2008-S2010 depicted in FIG. 20 are identical to steps S1508-S1510 depicted in FIG. 15 and description thereof is omitted.

In the operation depicted in FIG. 20, since the wireless signal is again transmitted to the UE 300, at step S2004 the PDCCH is transmitted, while the PDSCH need not be transmitted. In this case, step S2006 may be omitted.

The eNB 200, before step S2007, is set having timing t2, as the reception timing of the delivery confirmation information. Timing t2 is the time when the given period T1 elapses from the timing t1. The eNB 200, at step S2007, changes the reception timing of the delivery confirmation information to timing t4, which is when the given period T2 elapses from timing t3 when the wireless signal is retransmitted. The given period T2, for example, is a period combining the given period T1 and the period of time that the wireless signal is delayed consequent to the regeneration and relay by the RN 100.

Consequently, the eNB 200 can make the reception timing of the delivery confirmation information substantially coincide with the timing that the delivery confirmation information is transmitted at step S2010. By recursive execution of the above steps for each wireless signal transmitted by the eNB 200, the reception timing for the delivery confirmation information at the eNB 200 can be adjusted by the period of time that the wireless signal is delayed consequent to the regeneration and relay by the RN 100.

In this manner, if the relay information is received, the eNB 200 according to the third embodiment retransmits the wireless signal indicated by the relay information and at a reception timing when a given period elapses from the retransmission of the wireless signal, receives the delivery confirmation information concerning the wireless signal. Consequently, the same effects achieved by the first embodiment can be achieved.

In the third embodiment, although a configuration is described where the UE 300 transmits relay information to the eNB 200, configuration may be such that the UE 300 transmits to the eNB 200, the delivery confirmation information together with the relay information. For example, the UE 300 transmits to the eNB 200, NACK as the delivery confirmation information and stores the relay information to the NACK transmitted. Consequently, the relay information can be transmitted without newly adding a control channel.

The configuration of the RN 100 according to the fourth embodiment is identical to the configuration depicted in FIG. 1 and description thereof is omitted. However, the relay information generator 140 generates relay information that includes delay information that indicates the period of time that the wireless signal is delayed consequent to the regeneration and relay by the RN 100. For example, the memory of the RN 100 stores therein the delay information indicating the period of time that the wireless signal is delayed consequent to the regeneration and relay by the RN 100; and relay information generator 140 generates relay information that includes the delay information stored in the memory of the RN 100.

The memory of the RN 100 may store therein delay information correlating PDSCH data size and the period of time that the wireless signal is delayed consequent to the regeneration and relay by the RN 100. In this case, the relay information generator 140 generates relay information that includes, among the delay information stored in the memory of the RN 100, delay information that indicates the period of time correlated with the PDSCH data size indicated by the PDCCH control information of the received wireless signal.

The configuration of the eNB 200 according to the fourth embodiment is identical to the configuration depicted in FIG. 2 and description thereof is omitted. However, the ACK/NACK timing controller 270 delays the reception timing of the delivery confirmation information concerning the wireless signal indicated in the relay information, by the period of time indicated in the delay information included in the relay information. The configuration of the UE 300 according to the fourth embodiment is identical to the configuration depicted in FIG. 3 and description thereof is omitted.

The operation of the RN 100 according to the fourth embodiment is identical to the operation depicted in FIG. 5 and description thereof is omitted. However, at step S504, the RN 100 notifies the eNB 200 of relay information that includes delay information. The operation of the eNB 200 according to the fourth embodiment is identical to the operation depicted in FIG. 6 and description thereof is omitted. However, at step S603, based on the delay information included in the relay information, the eNB 200 changes the reception timing of the delivery confirmation information concerning the wireless signal transmitted at step S601. The operation of the UE 300 according to the fourth embodiment is identical to the operation depicted in FIG. 7 and description thereof is omitted.

Figure 21:
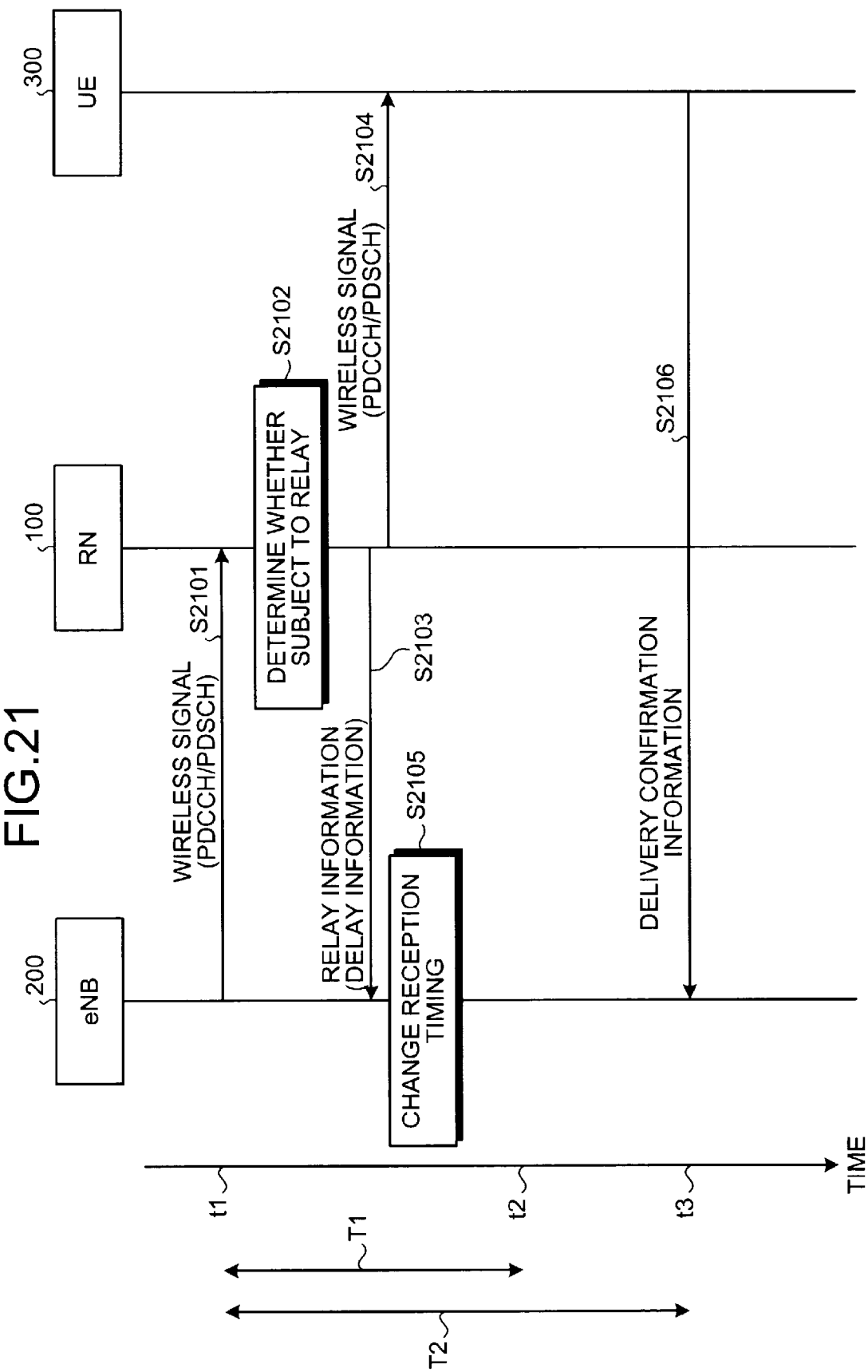
FIG. 21 is a sequence diagram of an example of operation of the communication system according to a fourth embodiment.

FIG. 21 is a sequence diagram of an example of operation of the communication system according to the fourth embodiment. Steps S2101, S2102 depicted in FIG. 21 are identical to steps S801, S802 depicted in FIG. 8 and description thereof is omitted. At step S2102, after determining that the wireless signal is subject to relay, the RN 100 notifies the eNB 200 of relay information indicating that the wireless signal transmitted at step S2101 is to be regenerated and relayed (step S2103). The relay information transmitted at step S2103 includes delay information indicating the period of time that the wireless signal is delayed consequent to the regeneration and relay by the RN 100.

The RN 100 transmits to the UE 300, the wireless signal transmitted at step S2101 (step S2104). The eNB 200, based on the relay information notified at step S2104, changes the reception timing of the delivery confirmation information concerning the wireless signal transmitted at step S2101 (step S2105).

At step S2105, the eNB 200 extends the given period of waiting, by the period of time indicated in the delay information included in the notified relay information. For example, the eNB 200 changes the reception timing of the delivery confirmation information to timing t3, which is the time when the given period T2 elapses from timing t1. The UE 300, by relay through the RN 100, transmits to the eNB 200, the delivery confirmation information concerning the wireless signal transmitted at step S2104 (step S2106), ending the series of operations.

The eNB 200, before step S2105, is set having timing t2, as the reception timing of the delivery confirmation information. Timing t2 is the time when the given period T1 elapses from timing t1. The eNB 200, at step S2105, changes the reception timing of the delivery confirmation information to timing t3, which is when the given period T2 elapses from timing t1.

Consequently, the eNB 200 can make the reception timing of the delivery confirmation information substantially coincide with the timing that the delivery confirmation information is transmitted at step S2106. By recursive execution of the above steps for each wireless signal transmitted by the eNB 200, reception timing of the delivery confirmation information at the eNB 200 can be adjusted by the period of time that wireless signal is delayed consequent to the regeneration and relay of the RN 100.

In this manner, the RN 100 according to the fourth embodiment provides relay information that includes delay information indicating the period of time that a wireless signal is delayed consequent to the regeneration and relay by the RN 100. Consequently, at the eNB 200, the reception timing of the delivery confirmation information can be accurately adjusted by the period of time that the wireless signal is delayed by the regeneration and relay by the RN 100. The eNB 200 delays the reception timing of the delivery confirmation information, by the period of time indicated in the delay information included in the relay information notified by the RN 100, thereby enabling the delivery confirmation information to be received with highly precisely timing.

Therefore, according to the fourth embodiment, the same effects achieved by the first embodiment are achieved and the retransmission control can be further stabilized. In particular, when the period of delay consequent to regeneration and relay differs at each RN (e.g., the RN 100), the delay information from the RN is notified to the eNB 200, whereby at the eNB 200, reception timing of the delivery confirmation information can be accurately adjusted accordingly.

Figure 22:
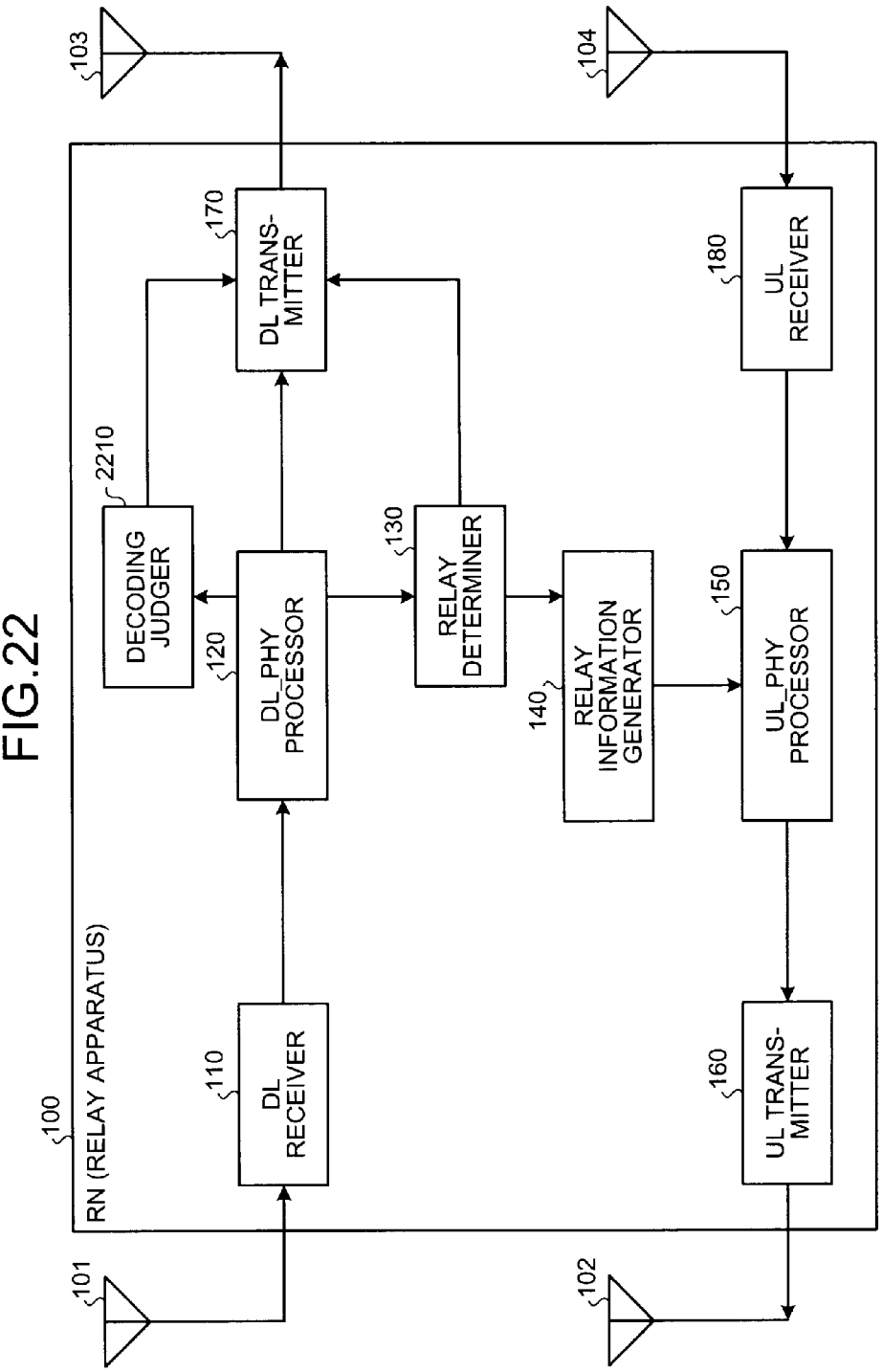
FIG. 22 is a block diagram of the RN according to a fifth embodiment.

FIG. 22 is a block diagram of the RN according to a fifth embodiment. In FIG. 22, components identical to those depicted in FIG. 1 are given the same reference numerals used in FIG. 1 and description thereof is omitted. As depicted in FIG. 22, the RN 100 according to the fifth embodiment includes a decoding judger 2210 in addition to the configuration depicted in FIG. 1.

The DL_PHY processor 120 outputs to the decoding judger 2210, the control information and data received from the DL receiver 110. The decoding judger 2210, based on the control information and data received from the DL_PHY processor 120, judges whether the wireless signal received by the RN 100 has been properly decoded and outputs a judgment result to the DL transmitter 170.

For example, the decoding judger 2210 performs error detection on the control information and data and if an error is detected, the decoding judger 2210 judges that the wireless signal has not been decoded properly; and if no error is detected, judges that the wireless signal has been properly decoded. Further, the decoding judger 2210 performs error detection on the control information and data, and if an error can be corrected, the decoding judger 2210 judges that the wireless signal is properly decoded; and if the error cannot be corrected, judges that the wireless signal is not be properly decoded.

If a determination result is output from the relay determiner 130, indicating that the wireless signal is subject to relay and a judgment result is output from the decoding judger 2210, indicating that the wireless signal has been properly decoded, the DL transmitter 170 encodes and transmits the control information and data, whereby the data and control information of the wireless signal transmitted by the eNB 200 are regenerated and relayed to the UE 300.

If a determination result is output from the relay determiner 130, indicating that the wireless signal is subject to relay and a judgment result is output from the decoding judger 2210, indicating that the wireless signal has not been properly decoded, the DL transmitter 170 encodes and transmits only the control information, among the control information and data, whereby the control information is regenerated and relayed the UE 300, without the data of the wireless signal transmitted by the eNB 200 being regenerated and relayed. The configuration of the eNB 200 according to the fifth embodiment is identical to the configuration depicted in FIG. 2 and description thereof is omitted. The configuration of the UE 300 according to the fifth embodiment is identical to the configuration depicted in FIG. 3 and description thereof is omitted.

Figure 23:
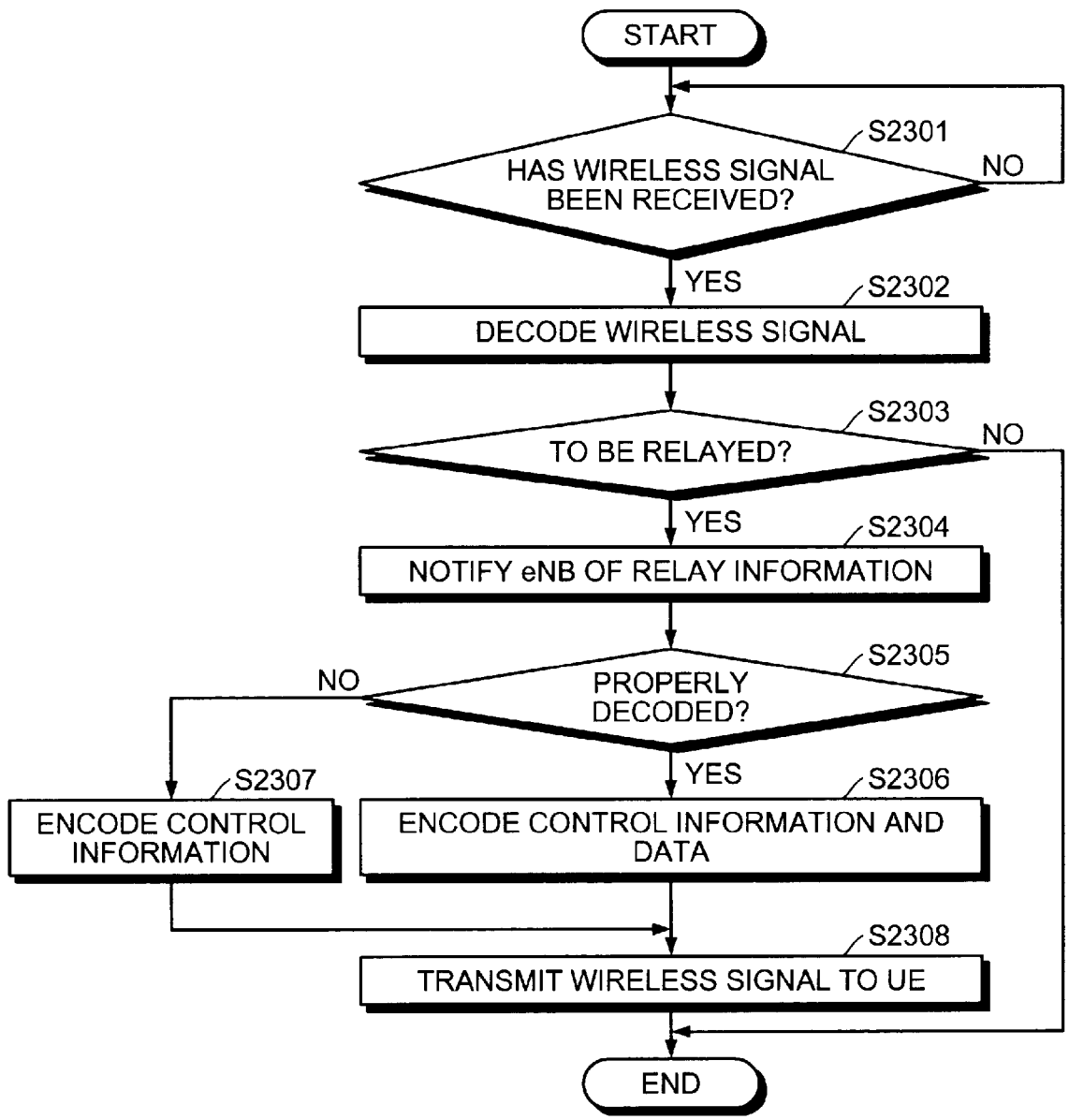
FIG. 23 is a flowchart of an example of operation of the RN according to the fifth embodiment.

FIG. 23 is a flowchart of an example of operation of the RN according to the fifth embodiment. Steps S2301-S2304 depicted in FIG. 23 are identical to steps S501-S504 depicted in FIG. 5 and description thereof is omitted. After step S2304, the RN 100 judges whether the wireless signal has been properly decoded at step S2302 (step S2305).

At step S2305, if the RN 100 judges that the wireless signal has been properly decoded (step S2305: YES), the RN 100 encodes the control information and data decoded at step S2302 (step S2306). If the RN 100 judges that the wireless signal has not been properly decoded (step S2305: NO), the RN 100 encodes only the control information, among the control information and data decoded at step S2302, (step S2307).

The RN 100 transmits to the UE 300, the wireless signal encoded at step S2306 or step S2307 (step S2308), ending the series of operations. By recursively performing the above steps, when the RN 100 receives a wireless signal that is subject to relay, the RN 100 notifies the eNB 200 that the wireless signal is to be relayed and regenerated, and is able to regenerate and relay the wireless signal. Further, if the wireless signal is not properly decoded at the RN 100, the wireless signal is not regenerated and relayed. However, in this case, by regenerating and relaying the control information to the UE 300, NACK can be transmitted from the UE 300 to the eNB 200.

The operation of the eNB 200 according to the fifth embodiment is identical to the operation depicted in FIG. 6 and description thereof is omitted. The operation of the UE 300 according to the fifth embodiment is identical to the operation depicted in FIG. 7 and description thereof is omitted. However, if the control information is regenerated and relayed without regeneration and relay of the data from the RN 100, the UE 300 transmits to the eNB 200, NACK concerning the wireless signal indicated in the control information.

Figure 24:
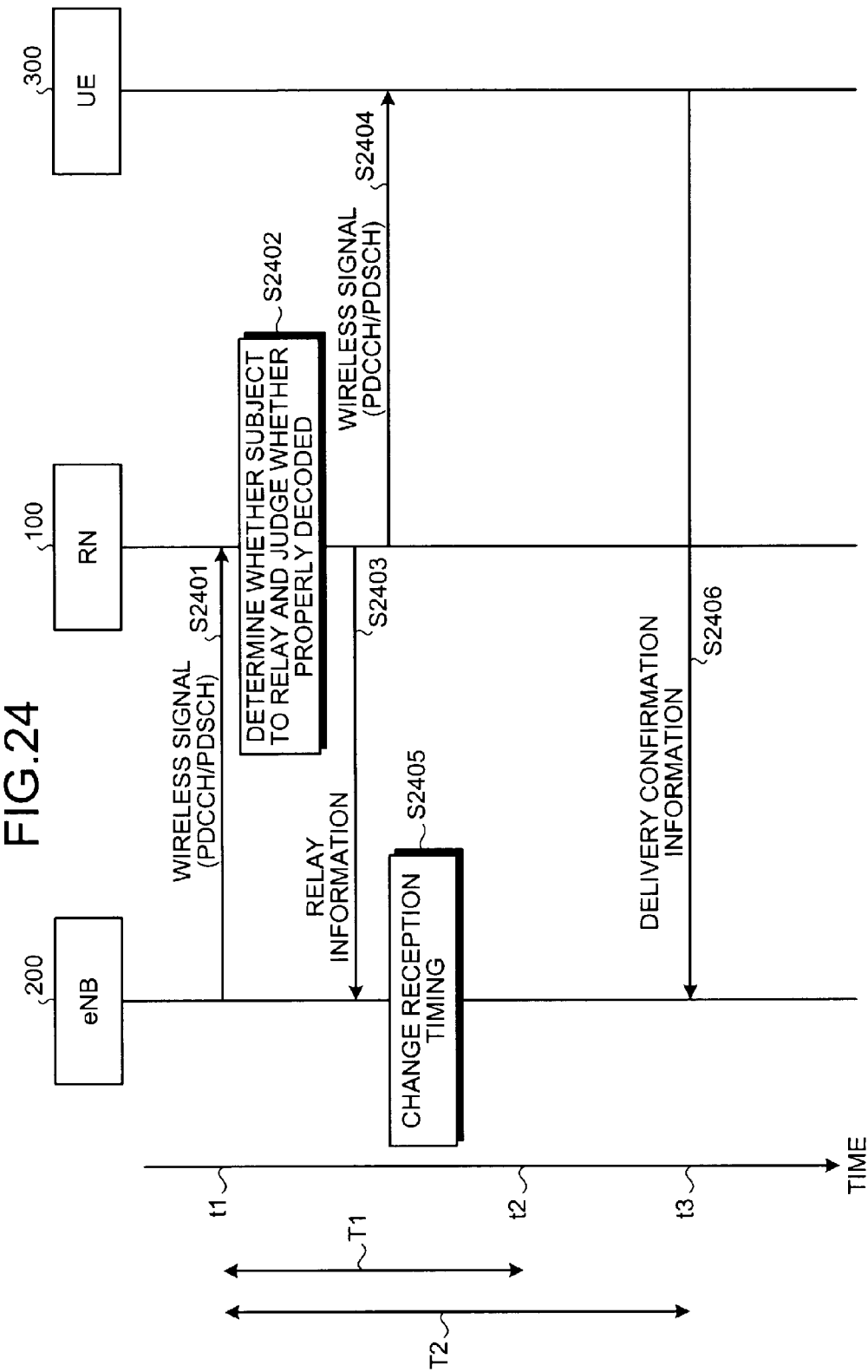
FIG. 24 is a sequence diagram of an example of operation of the communication system according to the fifth embodiment.

FIG. 24 is a sequence diagram of an example of operation of the communication system according to the fifth embodiment. The eNB 200, at timing t1, transmits a downlink wireless signal addressed to the UE 300 (step S2401). The wireless signal transmitted at step S2401 includes PDCCH control information and PDSCH data. The wireless signal transmitted at step S2401 is received by the RN 100.

The RN 100 determines whether the wireless signal transmitted at step S2401 is subject to relay and judges whether the wireless signal transmitted at step S2401 has been properly decoded (decoding judgment) (step S2402). In this example, it is assumed that the wireless signal is subject to relay and has been properly decoded. The operation proceeds to step S2403.

Steps S2403-S2406 depicted in FIG. 24 are identical to steps S803-S806 depicted in FIG. 8 and description thereof is omitted. By an execution of the above steps for each wireless signal transmitted by the eNB 200, the reception timing of the delivery confirmation information at the eNB 200 can be adjusted by the period of time that the wireless signal is delayed consequent to the regeneration and relay by the RN 100.

In this manner, the RN 100 according to the fifth embodiment performs decoding judgment with respect to the decoded wireless signal and if the wireless signal has been properly decoded, the RN 100 regenerates and relays the wireless signal to the UE 300. Consequently, the same effects achieved by the first embodiment are achieved; and if the wireless signal has not been properly decoded at the time of reception by the RN 100, the RN 100 does not regenerate and relay the wireless signal to the UE 300, whereby the utilization efficiency of the communication resources can be improved.

Figure 25:
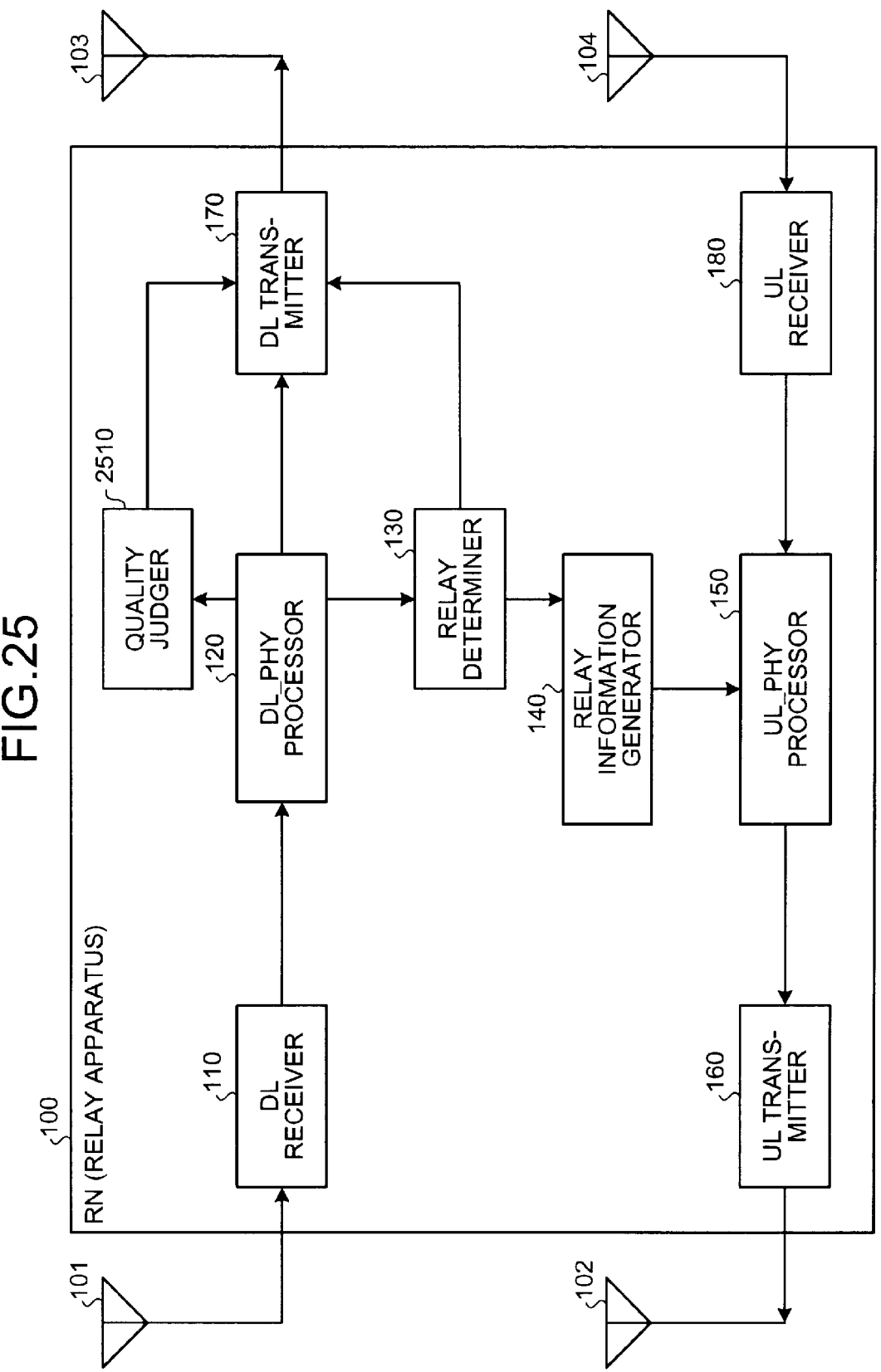
FIG. 25 is a block diagram of the RN according to a sixth embodiment.

FIG. 25 is a block diagram of the RN according to a sixth embodiment. In FIG. 25, components identical to those depicted in FIG. 1 are given the same reference numerals used in FIG. 1, and description thereof is omitted. As depicted in FIG. 25, the RN 100 according to the sixth embodiment includes a quality judger 2510 in addition to the configuration depicted in FIG. 1. The DL_PHY processor 120 outputs to the quality judger 2510, the control information and data received from the DL receiver 110.

The quality judger 2510 measures the quality of the control information and data output by the DL_PHY processor 120 and judges whether the measured quality is at least equal to a threshold. The quality judger 2510 outputs a judgment result to the DL transmitter 170. The quality measured by the quality judger 2510 is, for example, the signal to interference power ration (SIR).

If the determination result received from the relay determiner 130 indicates that the wireless signal is subject to relay and the judgment result received from the quality judger 2510 indicates that the quality is greater than or equal the threshold, the DL transmitter 170 encodes the control information and data received from the DL_PHY processor 120. The DL transmitter 170 transmits, via the DL transmitting antenna 103, the encoded control information and data. Consequently, the data and control information of the wireless signal transmitted by the eNB 200 is regenerated and relayed to the UE 300.

If the determination result received from the relay determiner 130 indicates that the wireless signal is subject to relay and the judgment result received from the quality judger 2510 indicates that the quality is less than the threshold, the DL transmitter 170 encodes and transmits only the control information, among the control information and data. Consequently, the control information is regenerated and relayed to the UE 300, without the data of the wireless signal transmitted by the eNB 200 being regenerated and relayed. The configuration of the eNB 200 according to the sixth embodiment is identical to the configuration depicted in FIG. 2 and description thereof is omitted. The configuration of the UE 300 according to the sixth embodiment is identical to the configuration depicted in FIG. 3 and description thereof is omitted.

Figure 26:
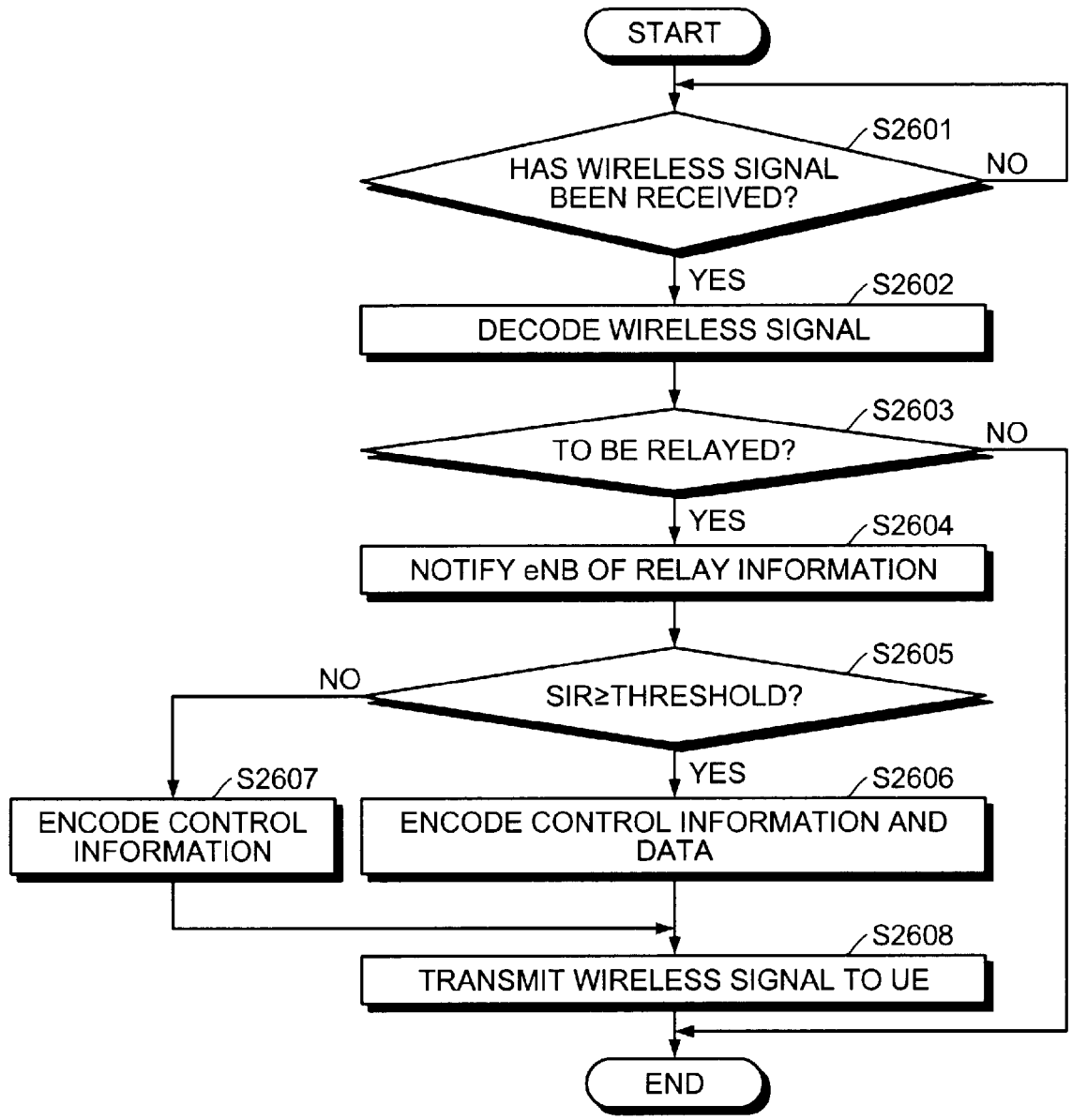
FIG. 26 is a flowchart of an example of operation of the RN according to the sixth embodiment.

FIG. 26 is a flowchart of an example of operation of the RN according to the sixth embodiment. Steps S2601-S2604 depicted in FIG. 26 are identical to steps S501-S504 depicted in FIG. 5 and description thereof is omitted. After step S2604, the RN 100 determines whether the SIR of the control information and data decoded at step S2602 is at least equal to a threshold (step S2605).

At step S2605, if the SIR of the control information and data is greater than or equal to the threshold (step S2605: YES), the RN 100 encodes the control information and data decoded at step S2602 (step S2606). If the SIR of the control information and data is less than the threshold (step S2605: NO), the RN 100 encodes only the control information, among the control information and data decoded at step S2602 (step S2607).

The RN 100 transmits to the UE 300, the wireless signal encoded at step S2606 or step S2607 (step S2608), ending the series of operations. By recursively performing the above steps, when the RN 100 receives a wireless signal to be related, the RN 100 can notify the eNB 200 that the wireless signal is to be regenerated and relayed. Further, if the SIR of the wireless signal is less than the threshold, the wireless signal is not regenerated and relayed. However, in this case, by regenerating and relaying the control information to the UE 300, NACK can be transmitted from the UE 300 to the eNB 200.

The operation of the eNB 200 according to the sixth embodiment is identical to the operation depicted in FIG. 6 and description thereof is omitted. The operation of the UE 300 according to the sixth embodiment is identical to the operation depicted in FIG. 7 and description thereof is omitted. However, if the control information is regenerated and relayed without the regeneration and relay of the data from the RN 110, the UE 300 transmits to the eNB 200, NACK concerning the wireless signal indicated in the control information.

Figure 27:
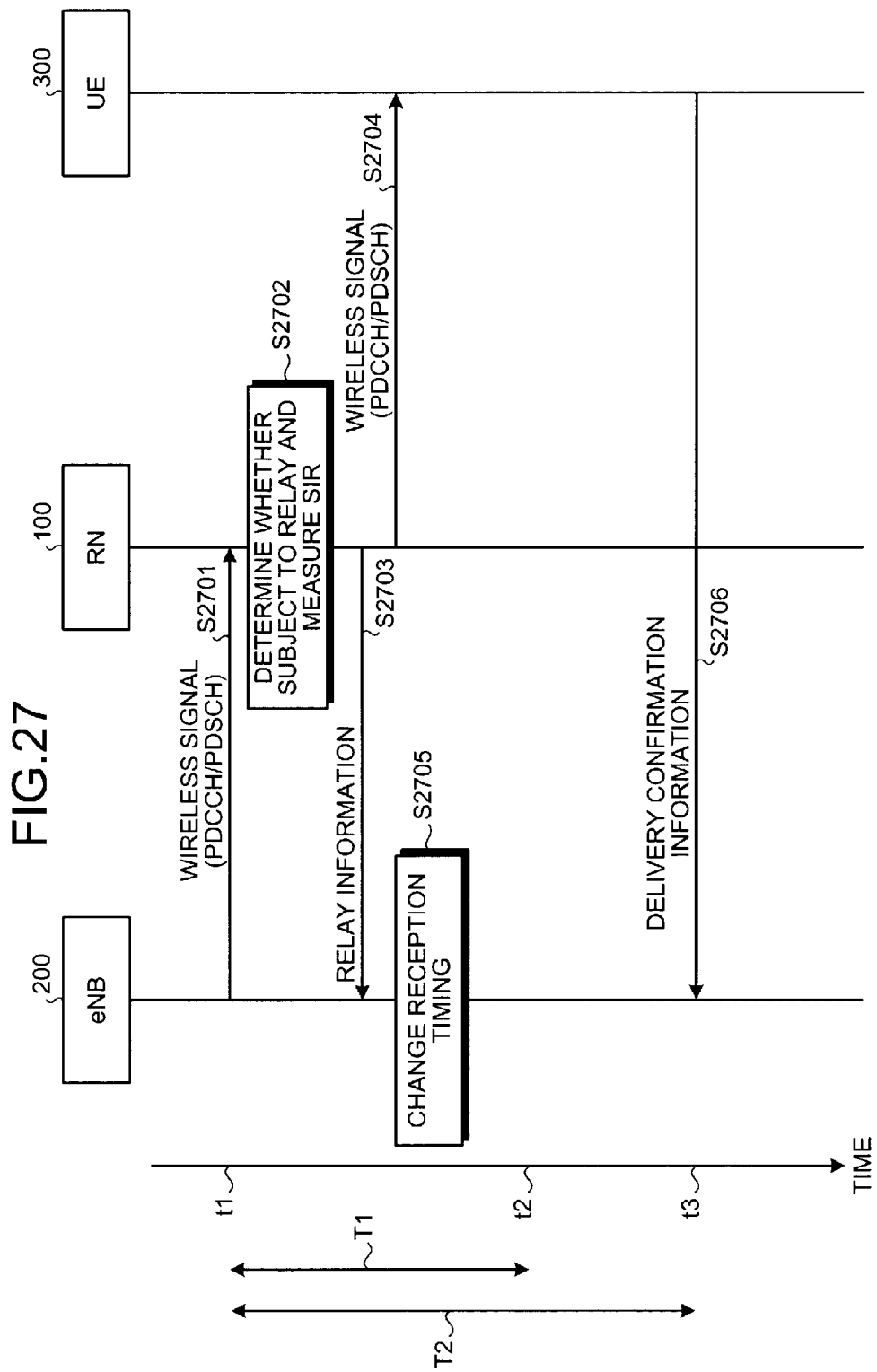
FIG. 27 is a sequence diagram of an example of operation of the communication system according to the sixth embodiment.

FIG. 27 is a sequence diagram of an example of operation of the communication system according to the sixth embodiment. The eNB 200, at timing t1, transmits a downlink wireless signal addressed to the UE 300 (step S2701). The wireless signal transmitted at step S2701 includes PDCCH control information and PDSCH data. The wireless signal transmitted at step S2701 is received by the RN 100.

The RN 100 determines whether the wireless signal transmitted at step S2701 is subject to relay and determines whether the SIR of the wireless signal transmitted at step S2701 is at least equal to the threshold (step S2702). In this example, it is assumed that the wireless signal is subject to relay and the SIR is greater than or equal to the threshold. The operation proceeds to step S2703. Steps S2703-S2706 depicted in FIG. 27 are identical to steps S803-S806 depicted in FIG. 8 and description thereof is omitted.

In this manner, the RN 100 according to the sixth embodiment measures the communication quality of the decoded wireless signal and if the measured communication quality is greater than or equal to the threshold, the RN 100 regenerates and relays the wireless signal to the UE 300. Consequently, the same effects achieved by the first embodiment are achieved; and if the wireless signal deteriorates at the time of reception by the RN 100, the RN 100 does not regenerate and relay the wireless signal to the UE 300, whereby the utilization efficiency of the communication resources can be improved.

The configuration of the RN 100 according to the seventh embodiment is identical to the configuration depicted in FIG. 16 and description thereof is omitted. The configuration of the eNB 200 according to the seventh embodiment is identical to the configuration depicted in FIG. 2 and description thereof is omitted.

Figure 28:
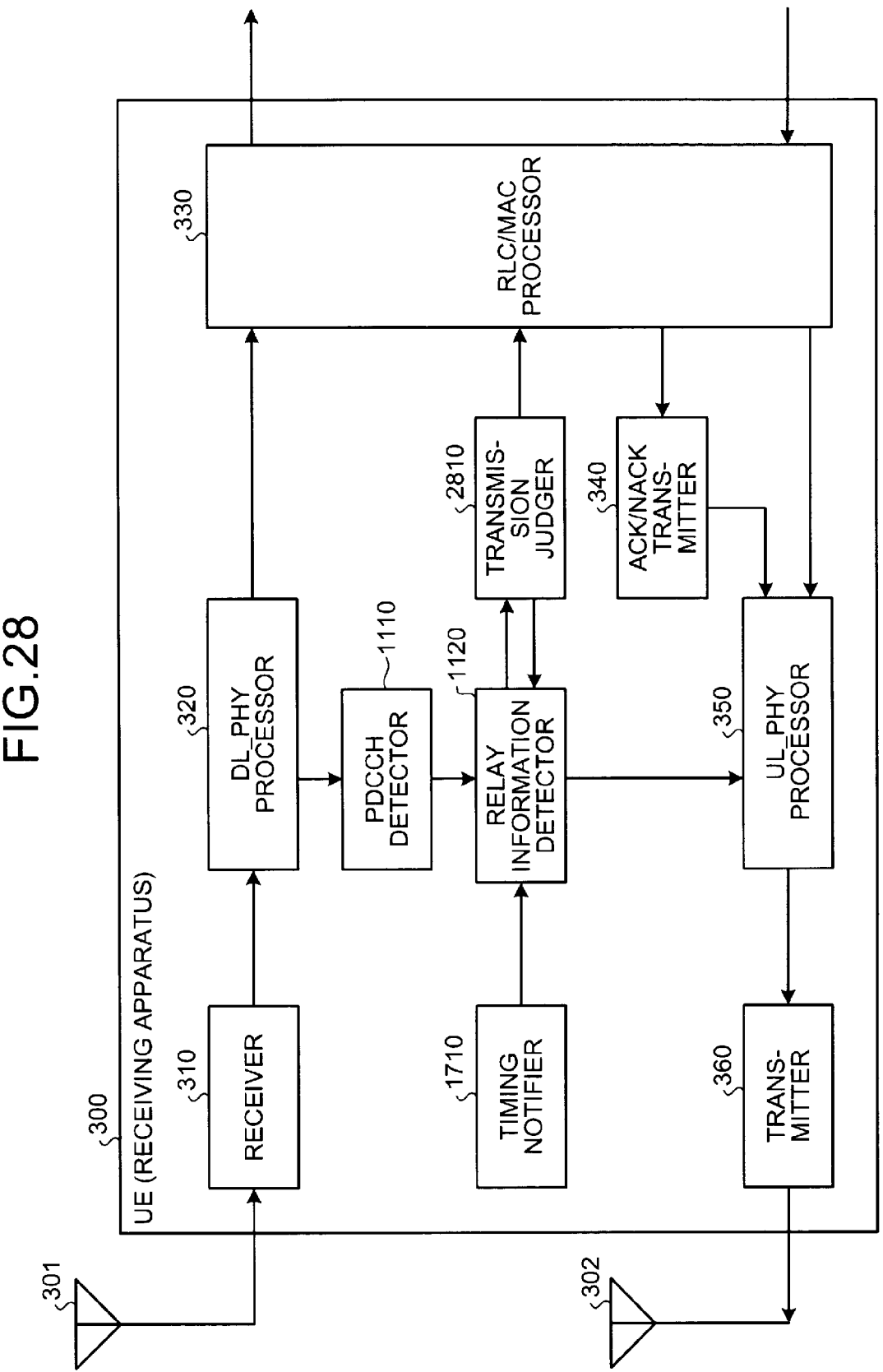
FIG. 28 is a block diagram of the UE according to a seventh embodiment.

FIG. 28 is a block diagram of the UE according to the seventh embodiment. In FIG. 28, components identical to those depicted in FIG. 17 are given the same reference numerals used in FIG. 17 and description thereof is omitted. As depicted in FIG. 28, the UE 300 according to the seventh embodiment includes a transmission judger 2810 in addition to the configuration depicted in FIG. 17. The relay information detector 1120, upon detecting relay information, outputs the detected relay information to the transmission judger 2810.

Upon receiving from the transmission judger 2810, a judgment result indicating that the delivery confirmation information cannot be transmitted, the relay information detector 1120 outputs the detected relay information to the UL_PHY processor 350, at the timing notified by the timing notifier 1710. Upon receiving from the transmission judger 2810, a judgment result indicating that the delivery confirmation information can be transmitted, the relay information detector 1120 does not output the detected relay information to the UL_PHY processor 350.

The transmission judger 2810, upon receiving the relay information from the relay information detector 1120, determines whether the delivery confirmation information concerning the wireless signal indicated in the relay information can be transmitted at the reception timing at the eNB 200. For example, the memory of the UE 300 stores therein delay information indicating the period of time that the wireless signal is delayed by the regeneration and relay by the RN 100.

If the period of time indicated in the delay information is less than a threshold, the transmission judger 2810 judges that the delivery confirmation information can be transmitted and if the period of time is greater than or equal to the threshold, the transmission judger 2810 judges that the delivery confirmation information cannot be transmitted. The transmission judger 2810 outputs a judgment result to the relay information detector 1120 and the RLC/MAC processor 330.

Upon receiving from the transmission judger 2810, a judgment result indicating that delivery confirmation information cannot be transmitted before the reception timing, the RLC/MAC processor 330 discards the control information and data received from the DL_PHY processor 320. Upon receiving from the transmission judger 2810, a judgment result indicating that delivery confirmation information can be transmitted before the reception timing, the RLC/MAC processor 330 executes layer 2 processing on the control information and data received from the DL_PHY processor 320. The RLC/MAC processor 330 outputs to the ACK/NACK transmitter 340, a result of error determination for the control information and data.

The operation of the RN 100 according to the seventh embodiment is identical to the operation depicted in FIG. 18 and description thereof is omitted. The operation of the eNB 200 according to the seventh embodiment is identical to the operation depicted in FIG. 6 and description thereof is omitted.

Figure 29:
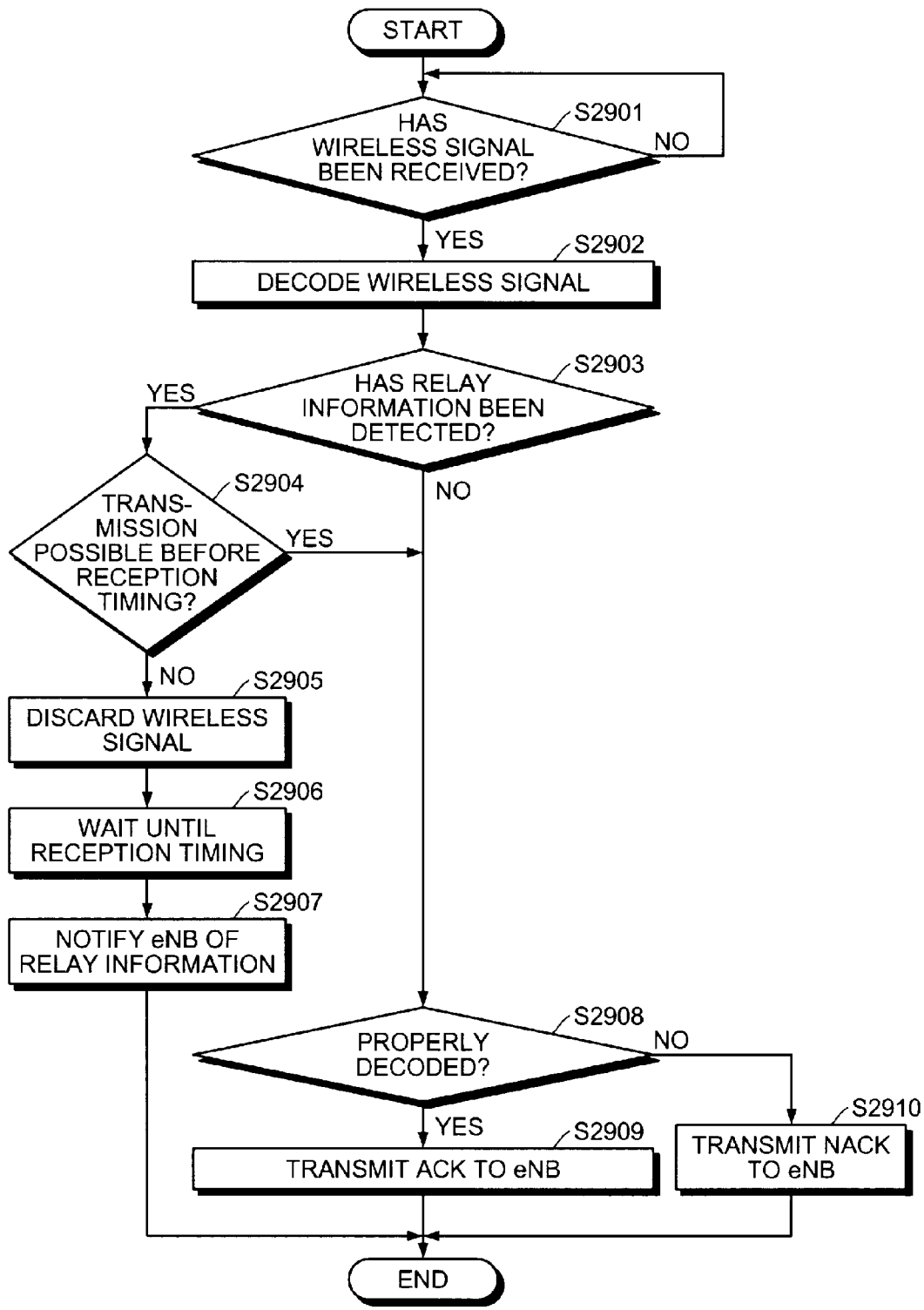
FIG. 29 is a flowchart of operation of the UE according to the seventh embodiment.

FIG. 29 is a flowchart of operation of the UE according to the seventh embodiment. Steps S2901-S2903 depicted in FIG. 29 are identical to steps S1901-S1903 depicted in FIG. 19 and description thereof is omitted. At step S2903, if relay information is detected (step S2903: YES), the UE 300 judges whether delivery confirmation information concerning the wireless signal decoded at step S2902 can be transmitted before the reception timing at the eNB 200 (step S2904).

At step S2904, if transmission is possible before the reception timing at the eNB 200 (step S2904: YES), the operation proceeds to step S2908. If transmission is not possible before the reception timing at the eNB 200 (step S2904: NO), the operation proceeds to step S2905. Steps S2905-S2910 depicted in FIG. 29 are identical to steps S1904-S1909 depicted in FIG. 19 and description thereof is omitted.

By recursively performing the above steps, the UE 300 transmits ACK to the eNB 200, if the wireless signal transmitted by the eNB 200 has been properly decoded; and transmits NACK to the eNB 200, if the wireless signal transmitted by the eNB 200 has not been properly decoded. Further, if relay information is received from the RN 100 and the delivery confirmation information can be transmitted before the reception timing at the eNB 200, the UE 300 transmits the delivery confirmation information to the eNB 200.

If relay information is received from the RN 100 and the delivery confirmation information cannot be transmitted before the reception timing at the eNB 200, the UE 300 discards the wireless signal and transmits the relay information to the eNB 200. Consequently, for example, if the regeneration and relay by the RN 100 occurs at a high speed and the propagation environment is favorable, enabling the wireless signal to be received at a high speed, retransmission control can be performed without adjusting the reception timing of the delivery confirmation information at the eNB 200.

Therefore, retransmission control can be performed quickly. Furthermore, in this case, even if the UE 300 receives relay information, retransmission control can be performed even more quickly since the wireless signal does not have to be retransmitted by the eNB 200.

Figure 30:
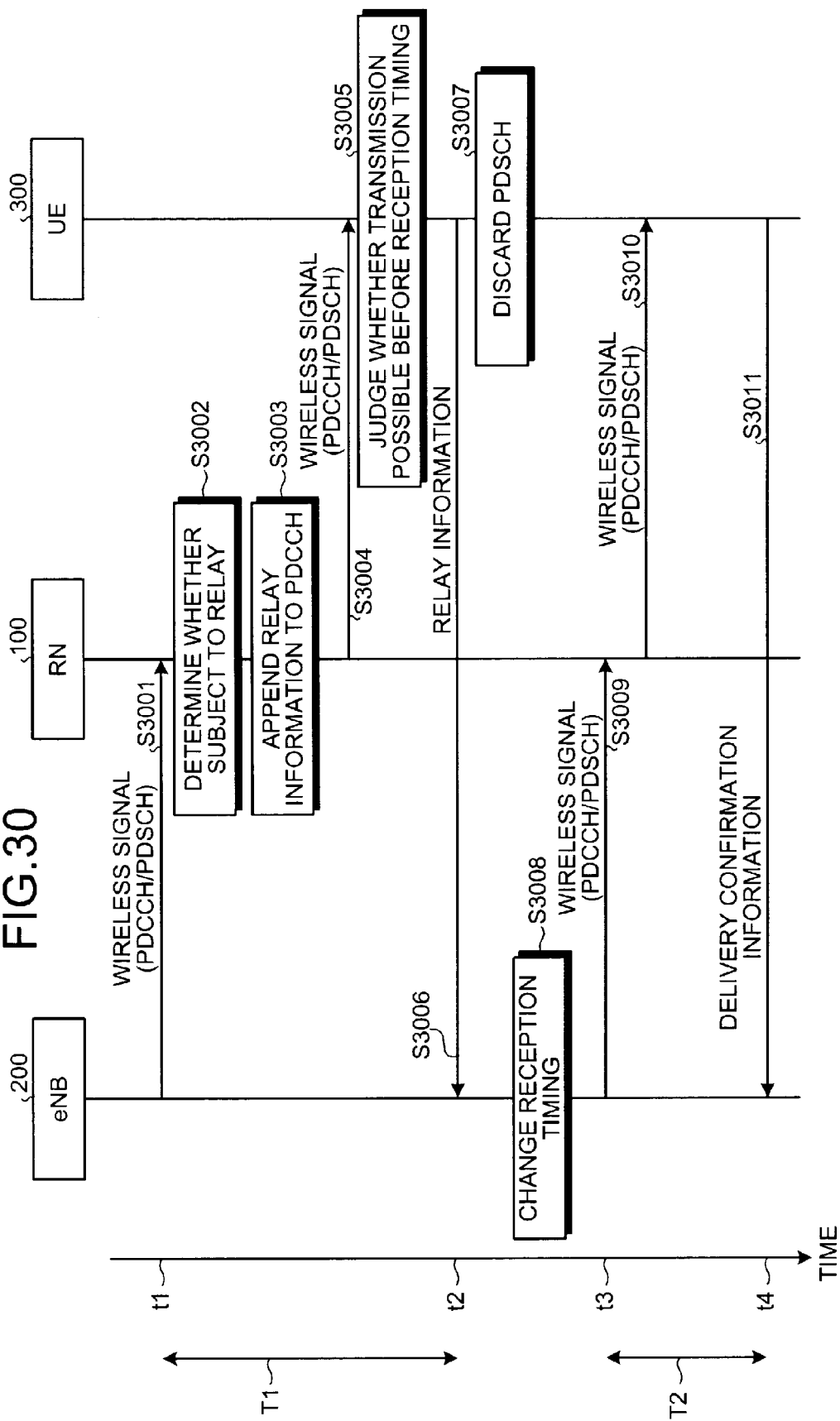
FIG. 30 is a sequence diagram of an example of operation of the communication system according to the seventh embodiment.

FIG. 30 is a sequence diagram of an example of operation of the communication system according to the seventh embodiment. Steps S3001-S3004 depicted in FIG. 30 are identical to steps S2001-S2004 depicted in FIG. 20 and description thereof is omitted. After step S3004, the UE 300 judges whether the delivery confirmation information concerning the wireless signal transmitted at step S3004 can be transmitted before the reception timing at the eNB 200 (step S3005).

The reception timing at step S3005 is timing t2. In this example, it is judged that the delivery confirmation information cannot be transmitted before timing t2. Steps S3007-S3011 depicted in FIG. 30 are identical to steps S2006-S2010 depicted in FIG. 20 and description thereof is omitted. By an execution f the above steps for each wireless signal transmitted by the eNB 200, the reception timing of the delivery confirmation information at the eNB 200 can be adjusted by the period of time that the wireless signal is delayed consequent to the regeneration and relay by the RN 100.

In this manner, the UE 300 according to the seventh embodiment determines whether the delivery confirmation information can be transmitted before the reception timing at the eNB 200 and if transmission cannot be performed before the reception timing, the UE 300 notifies the eNB 200 of the relay information, whereby the same effects achieved by the third embodiment are achieved and retransmission control can be performed quickly.

As described, according to the relay apparatus, the transmitting apparatus, the communication system, the receiving apparatus, and the communication method, transmitting apparatus (eNB) is notified that the wireless signal transmitted by transmitting apparatus (eNB) is to be regenerated and relayed by the relay apparatus (RN), whereby at transmitting apparatus, the reception timing of the delivery confirmation information can be adjusted by the period of time that the wireless signal is delayed consequent to the regeneration and relay by the relay apparatus, enabling retransmission control to be stabilized.

In the embodiments above, the relay apparatus, the transmitting apparatus, the communication system, the receiving apparatus, and the communication method have been described in the case of application to a configuration in which a signal is transmitted from the eNB to the UE. However, the relay apparatus, the transmitting apparatus, the communication system, the receiving apparatus, and the communication method are applicable to a configuration in which a signal is transmitted from the UE to the eNB.

For example, the configuration of the eNB 200 in the embodiments is provided in the UE and the configuration of the UE 300 is provided in the eNB, whereby even for a configuration in which a signal is transmitted from the UE to the eNB, the effects of the embodiments are obtained. An eighth embodiment will be described as one example of application to a configuration where in the first embodiment, a signal is transmitted from the UE to the eNB.

Figure 31:
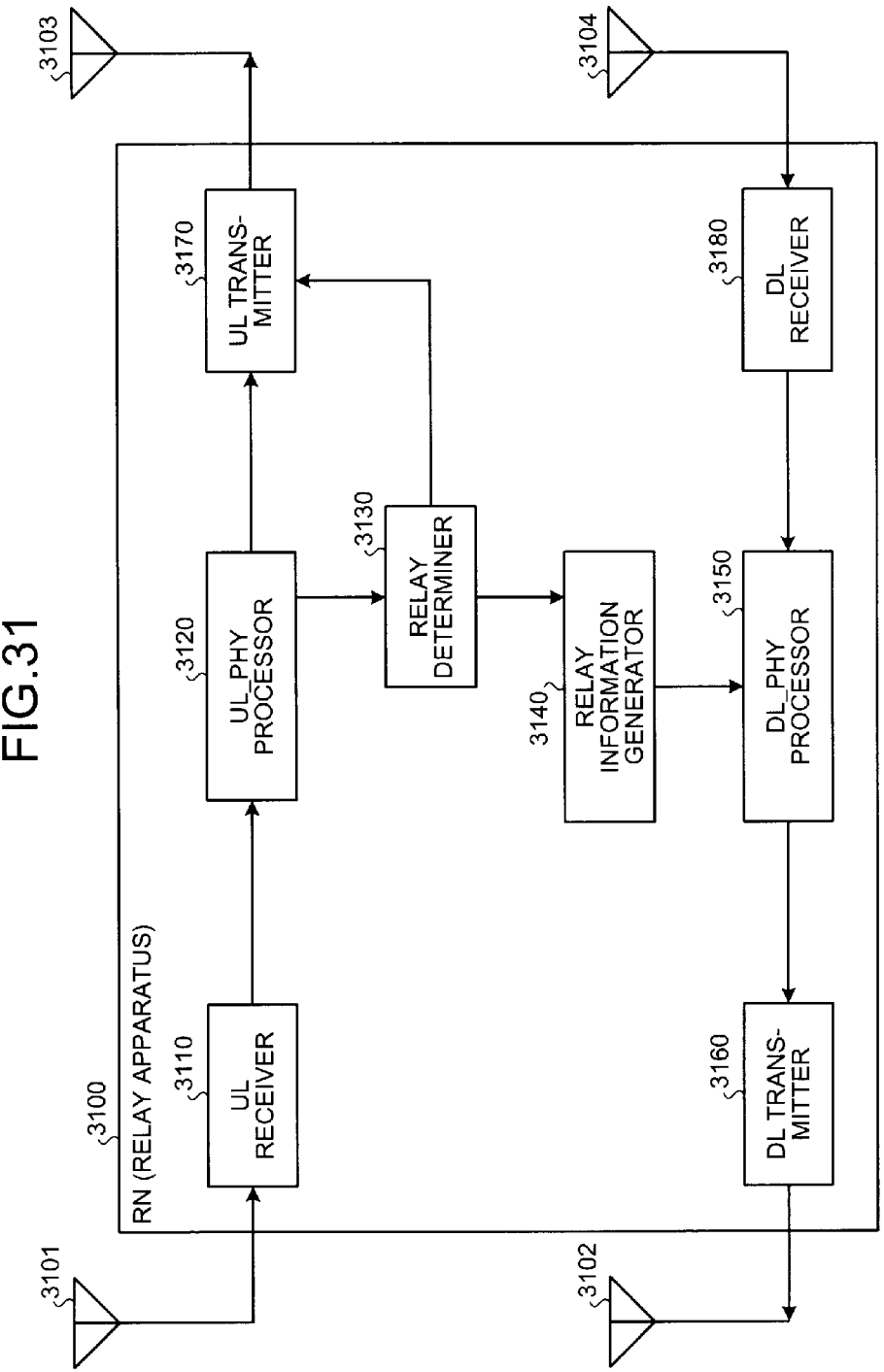
FIG. 31 is a block diagram of the RN according to an eighth embodiment.

FIG. 31 is a block diagram of the RN according to an eighth embodiment. The RN according to the eighth embodiment is a relay apparatus that in a communication system that includes a UE (refer to FIG. 32) and an eNB (refer to FIG. 33), regenerates and relays a wireless signal transmitted by the UE to the eNB. The UE, after a given period elapses from the transmission of the wireless signal to the eNB, receives from the eNB, delivery confirmation information concerning the wireless signal.

As depicted in FIG. 31, an RN 3100 according to the eighth embodiment includes a UL receiving antenna 3101, a DL transmitting antenna 3102, a UL transmitting antenna 3103, a DL receiving antenna 3104, a UL receiver 3110, a UL_PHY processor 3120, a relay determiner 3130, a relay information generator 3140, a DL_PHY processor 3150, a DL transmitter 3160, a UL transmitter 3170, and a DL receiver 3180. The UL_PHY processor 3120, the relay determiner 3130, and the DL_PHY processor 3150 are implemented by a computing unit such as a CPU.

The UL receiver 3110 receives, via the UL receiving antenna 3101, an uplink wireless signal transmitted by the UE. The wireless signal received by the UL receiver 3110 includes PUCCH control information and PUSCH data.

The control information, for example, includes the transmission source (in this example, the UE) and the destination (in this example, the eNB) of the wireless signal. The UL receiver 3110 decodes the received control information and data and outputs the decoded control information and data to the UL_PHY processor 3120.

The UL_PHY processor 3120 performs layer 1 (physical layer) processing on the control information and data received from the UL receiver 3110. The UL_PHY processor 3120 outputs the processed control information to the relay determiner 3130. The UL_PHY processor 3120 further outputs the processed control information and data to the UL transmitter 3170.

The relay determiner 3130, based on the control information received from the UL_PHY processor 3120, determines whether the wireless signal received by the UL receiver 3110 is subject to relay by the RN 3100. For example, the memory of the RN 3100 stores therein registration information indicating the destinations of the wireless signals that are to be relayed by the RN 3100. The relay determiner 3130 determines whether the destination included in the control information is included in the registration information, whereby the relay determiner 3130 determines whether the wireless signal is subject to relay by the RN 3100. The relay determiner 3130 outputs a determination result to the UL transmitter 3170 and the relay information generator 3140, respectively.

The relay information generator 3140, upon receiving from the relay determiner 3130, a determination result indicating that the wireless signal is subject to relay by the RN 3100, generates relay information and outputs the generated relay information to the DL_PHY processor 3150. The relay information generated by the relay information generator 3140 is information indicating that the wireless signal addressed to the eNB and transmitted by the UE, is to be regenerated and relayed by the RN 3100.

The DL_PHY processor 3150, upon receiving the relay information from the relay information generator 3140, assigns the relay information to a PDCCH and outputs the PDCCH assigned relay information to the DL transmitter 3160. The DL_PHY processor 3150 further performs layer 1 (physical layer) processing on delivery confirmation information (ACK or NACK) received from the DL receiver 3180, and outputs the processed delivery confirmation information to the DL transmitter 3160.

The DL transmitter 3160 encodes the relay information received from the DL_PHY processor 3150 and transmits the encoded relay information to the UE, via the DL transmitting antenna 3102. The DL transmitter 3160 further encodes the delivery confirmation information received from the DL_PHY processor 3150 and transmits the encoded delivery confirmation information to the UE, via the DL transmitting antenna 3102.

The UL transmitter 3170, upon receiving from the relay determiner 3130, a determination result indicating that the wireless signal is subject to relay by the RN 3100, encodes the control information and data received from the UL_PHY processor 3120. The UL transmitter 3170 transmits the encoded control information and data to the eNB, via the UL transmitting antenna 3103.

The DL receiver 3180 receives via the DL receiving antenna 3104, the wireless signal transmitted by the eNB and decodes the received delivery confirmation information. The wireless signal received by the DL receiver 3180 includes PDCCH control information. The PDCCH control information includes delivery confirmation information (ACK or NACK) that concerns the wireless signal transmitted by the UE and is regenerated and relayed by the RN 3100. The DL receiver 3180 outputs the decoded control information to the DL_PHY processor 3150.

Figure 32:
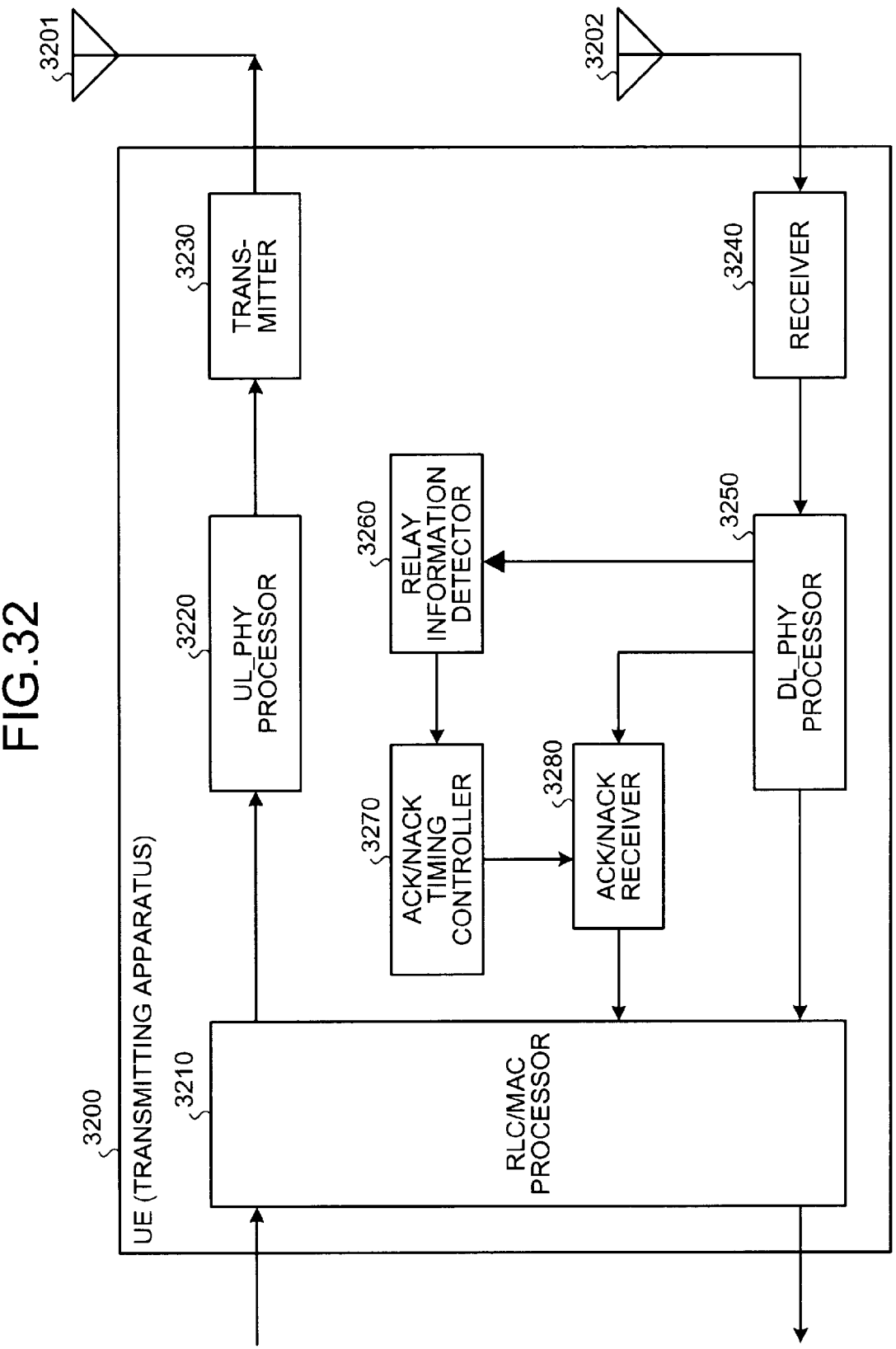
FIG. 32 is a block diagram of the UE according to the eighth embodiment.

FIG. 32 is a block diagram of the UE according to the eighth embodiment. The UE according to the eighth embodiment is a transmitting apparatus that after a given period has elapsed from the transmission of the wireless signal to the eNB, receives from the eNB, delivery confirmation information concerning the transmitted wireless signal. As depicted in FIG. 32, a UE 3200 according to the eighth embodiment includes a transmitting antenna 3201, a receiving antenna 3202, an RLC/MAC processor 3210, a UL_PHY processor 3220, a transmitter 3230, a receiver 3240, a DL_PHY processor 3250, a relay information detector 3260, an ACK/NACK timing controller 3270, and an ACK/NACK receiver 3280.

The RLC/MAC processor 3210 receives input of uplink data addressed to the eNB, from a higher level information processor, for example. The RLC/MAC processor 3210 performs layer 2 processing on the received data. The RLC/MAC processor 3210 outputs the layer 2 processed data and layer 2 control information to the UL_PHY processor 3220.

The RLC/MAC processor 3210, based on the delivery confirmation information (ACK or NACK) received from the ACK/NACK receiver 3280, performs retransmission control of the control information and data output to the UL_PHY processor 3220. For example, if NACK is received from the ACK/NACK receiver 3280, the RLC/MAC processor 3210 again outputs the control information and data to the UL_PHY processor 3220.

If ACK is received from the ACK/NACK receiver 3280, the RLC/MAC processor 3210 does not retransmit the data. The RLC/MAC processor 3210 further performs layer 2 processing on the uplink control information and data received from the DL_PHY processor 3250 and outputs the layer 2 processed control information and data to, for example, a higher level information processor.

The UL_PHY processor 3220 performs layer 1 processing on the control information and data received from the RLC/MAC processor 3210. The UL_PHY processor 3220 assigns the layer 1 processed control information to the PUCCH and outputs the PUCCH assigned control information to the transmitter 3230. The UL_PHY processor 3220 assigns layer 1 processed data to the PUSCH and outputs the PUSCH assigned data to the transmitter 3230.

The transmitter 3230 transmits, via the transmitting antenna 3201, the control information received from the UL_PHY processor 3220. The transmitter 3230 further transmits, via the transmitting antenna 3201, the data received from the UL_PHY processor 3220. The control information and data transmitted by the transmitter 3230 are received by the RN 3100 (refer to FIG. 31).

The receiver 3240 receives, via the receiving antenna 3202, a downlink wireless signal transmitted by the RN 3100. The wireless signal received by the receiver 3240 includes PDCCH control information and PDSCH data.

The PDCCH control information includes relay information transmitted by the RN 3100. The PDCCH control information further includes delivery confirmation information that is from the eNB and concerns the wireless signal transmitted by the UE 3200. The receiver 3240 decodes the received control information and data, and outputs the decoded control information and data to the DL_PHY processor 3250.

The DL_PHY processor 3250 performs layer 1 processing on the control information and data received from the receiver 3240 and outputs the layer 1 processed control information and data to the RLC/MAC processor 3210. The DL_PHY processor 3250 further outputs the layer 1 processed control information to the relay information detector 3260.

The relay information detector 3260 monitors the control information output by the DL_PHY processor 3250 and detects relay information included in the control information. The relay information detector 3260, upon detecting relay information, outputs the detected relay information to the ACK/NACK timing controller 3270.

The ACK/NACK timing controller 3270 controls the reception timing at which the ACK/NACK receiver 3280 receives the delivery confirmation information. For example, the ACK/NACK timing controller 3270 waits for a given period from the transmission of the wireless signal by the UE 3200. Upon the elapse of the given period, the ACK/NACK timing controller 3270 instructs the ACK/NACK receiver 3280 when the delivery confirmation information should be received.

The given period that the ACK/NACK timing controller 3270 waits, for example, is 4 sub-frames (a period of 4 transmissions of the wireless signal, which includes the PUCCH and the PUSCH), from the transmission of the wireless signal by the UE 3200. Upon receiving relay information from the relay information detector 3260, the ACK/NACK timing controller 3270 changes reception timing of the delivery confirmation information concerning the wireless signal indicated in the relay information.

For example, the memory of the UE 3200 stores therein delay information indicating the period of time that the wireless signal is delayed consequent to the regeneration and relay by the RN 3100. The ACK/NACK timing controller 3270 delays by the period of time indicated in the delay information, the reception timing of the delivery confirmation information concerning the wireless signal indicated in the relay information. For example, by the period of time indicated in the delay information, the ACK/NACK timing controller 3270 extends the given period of time that is waited from the transmission of the wireless signal by the UE 3200.

Upon being instructed by the ACK/NACK timing controller 3270 when the delivery confirmation information should be received, the ACK/NACK receiver 3280 receives delivery confirmation information included in the control information output by the DL_PHY processor 3250. The ACK/NACK receiver 3280 outputs the received delivery confirmation information to the RLC/MAC processor 3210.

Figure 33:
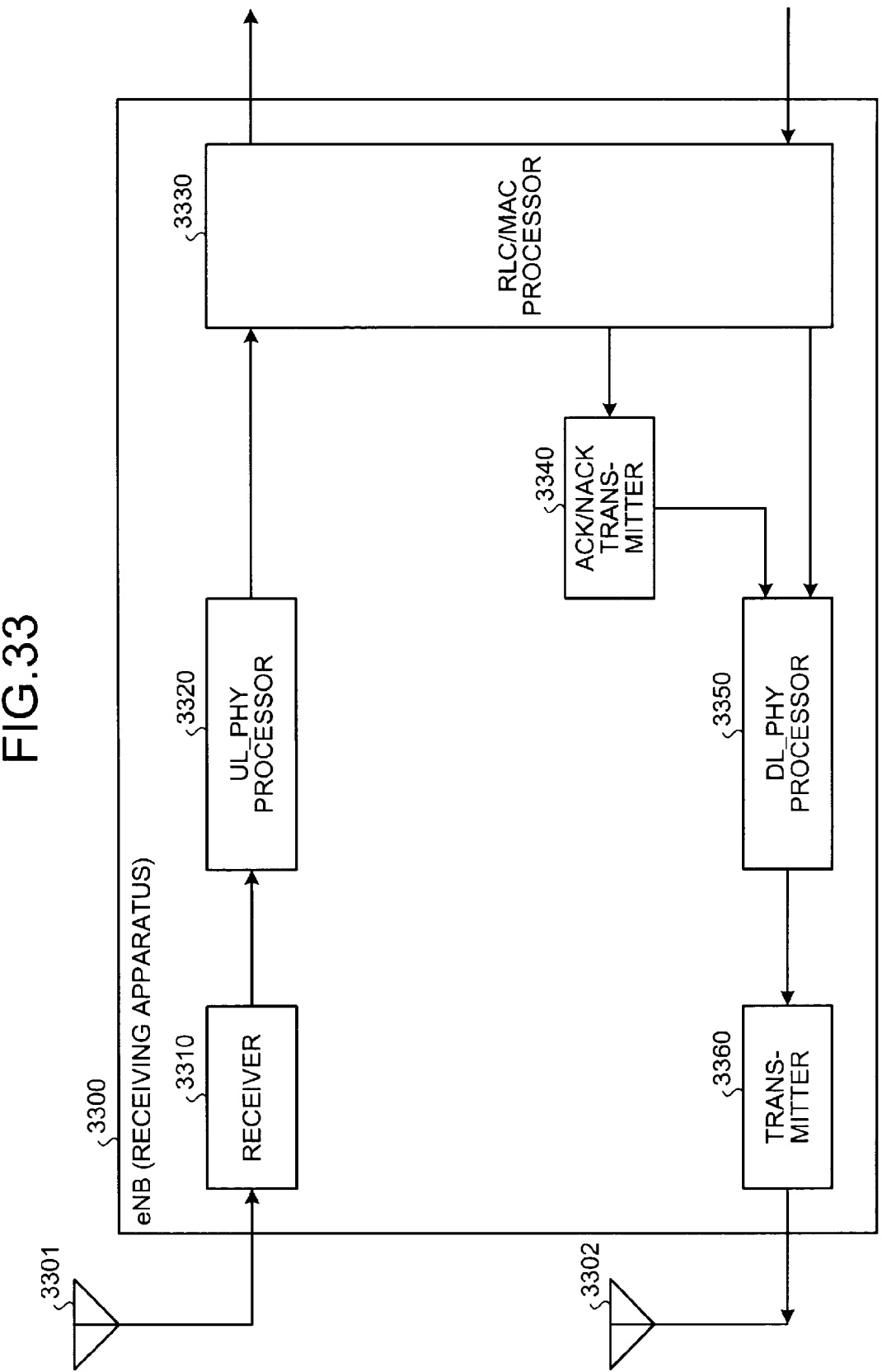
FIG. 33 is a block diagram of the eNB according to the eighth embodiment.

FIG. 33 is a block diagram of the eNB according to the eighth embodiment. The eNB according to the eighth embodiment is a receiving apparatus that receives a wireless signal transmitted from the UE 3200 (refer to FIG. 32) and relayed by the RN 3100 (refer to FIG. 31). As depicted in FIG. 33, an eNB 3300 according to the eighth embodiment includes a receiving antenna 3301, a transmitting antenna 3302, a receiver 3310, a UL_PHY processor 3320, a RLC/MAC processor 3330, an ACK/NACK transmitter 3340, a DL_PHY processor 3350, and a transmitter 3360.

The receiver 3310 receives, via the receiving antenna 3301, a wireless signal transmitted by the UE 3200, and regenerated and relayed by the RN 3100. The wireless signal received by the receiver 3310 includes PUCCH control information and PUSCH data. The receiver 3310 decodes the received control information and data and outputs the decoded control information and data to the UL_PHY processor 3320. The UL_PHY processor 3320 performs layer 1 processing on the control information and data received from the receiver 3310 and outputs the layer 1 processed control information and data to the RLC/MAC processor 3330.

The RLC/MAC processor 3330 performs layer 2 processing on the control information and data received from the UL_PHY processor 3320. For example, the RLC/MAC processor 3330 performs layer 2 error detection on the control information and data received from the UL_PHY processor 3320, and judges whether the wireless signal received by the receiver 3310 has been properly decoded. The RLC/MAC processor 3330 outputs a judgment result to the ACK/NACK transmitter 3340.

The RLC/MAC processor 3330 further outputs the layer 2 processed data to a higher level information processor, for example. The RLC/MAC processor 3330 receives input of uplink data addressed to the UE 3200 from, for example, a higher level information processor. The RLC/MAC processor 3330 performs layer 2 processing on the received data and outputs the layer 2 processed data and layer 2 control information to the DL_PHY processor 3350.

The ACK/NACK transmitter 3340, transmits delivery confirmation information to the UE 3200, according to the judgment result received from the RLC/MAC processor 3330. For example, if the judgment result received from the RLC/MAC processor 3330 indicates that the wireless signal has been properly decoded, the ACK/NACK transmitter 3340 outputs ACK, as delivery confirmation information, to the DL_PHY processor 3350. If the judgment result indicates that wireless signal has not been properly decoded, the ACK/NACK transmitter 3340 outputs NACK, as delivery confirmation information, to the DL_PHY processor 3350.

The DL_PHY processor 3350 performs layer 1 processing on the control information and data received from the RLC/MAC processor 3330 and outputs the layer 1 processed control information and data to the transmitter 3360. The DL_PHY processor 3350 assigns the delivery confirmation information (ACK or NACK) received from the ACK/NACK transmitter 3340 to the PDCCH and outputs the PDCCH assigned delivery confirmation information to the transmitter 3360.

The transmitter 3360 encodes the relay information and data received from the DL_PHY processor 3350. The transmitter 3360 transmits the encoded relay information and data, via the transmitting antenna 3302. The transmitter 3360 encodes the delivery confirmation information received from the DL_PHY processor 3350. The transmitter 3360 transmits the encoded delivery confirmation information, via transmitting antenna 3302. The relay information, data, and delivery confirmation information transmitted by the transmitter 3360 is relayed by the RN 3100 and received by the UE 3200.

In this manner, the RN 3100 according to the eighth embodiment, transmits to the UE 3200, relay information indicating that the wireless signal transmitted by the UE 3200 is to be regenerated and relayed by the RN 3100, whereby at the UE 3200, the reception timing of the delivery confirmation information can be adjusted by the period of time that the wireless signal is delayed consequent to the regeneration and relay by the RN 3100. Consequently, even if in the case of regeneration and relay by the RN 3100, the UE 3200 can receive the delivery confirmation information with highly precise timing, enabling stabilized retransmission control of the wireless signal to be performed.

Further, by transmitting relay information from the RN 3100 to the UE 3200, a wireless signal to be regenerated and relayed by the RN 3100 can be identified by the UE 3200 and the reception timing of the delivery confirmation information concerning the identified wireless signal can be adjusted. Hence, for wireless signals that are not regenerated and relayed by the RN 3100, the UE 3200 can received the delivery confirmation information with highly precise timing, without delaying the reception timing of the delivery confirmation information.

In this manner, even with application to a configuration where in the first embodiment, a signal is transmitted from the UE to the eNB, the same effects achieved by the first embodiment can be obtained. Similarly, for the second to seventh embodiments, application to a configuration where a signal is transmitted from the UE to eNB, the same effects achieved by the second to seventh embodiments can be obtained.

According to the disclosed relay apparatus, transmitting apparatus, communication system, receiving apparatus, and communication method, retransmission control can be stabilized.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:
1. A relay apparatus comprising:
a receiver that receives and decodes the wireless signal transmitted by a transmitting apparatus which, after a given period that starts after transmission of a wireless signal to a receiving apparatus, receives delivery confirmation information concerning the wireless signal;
a determiner that determines whether the decoded wireless signal is subject to relay;
a notifier that, if the determiner determines that the wireless signal is subject to relay, notifies the transmitting apparatus of relay information indicating that the wireless signal is to be regenerated and relayed to make the transmitting apparatus to delay the reception timing by a given amount and the relay information including delay information indicating a period of time that the wireless signal is delayed consequent to regeneration and relay by the relay apparatus; and a transmitter that transmits to the receiving apparatus, the wireless signal that has been determined to be subject to relay.

2. The relay apparatus according to claim 1, further comprising a decoding judger that judges whether the wireless signal received by the receiver has been properly decoded, wherein the transmitter transmits the wireless signal to the receiving apparatus, if the decoding judger judges that the wireless signal has been properly decoded.

3. The relay apparatus according to claim 1, further comprising a quality judger that judges whether communication quality of the wireless signal decoded by the receiver is at least equal to a threshold, wherein the transmitter transmits the wireless signal to the receiving apparatus, if the quality judger judges that the communication quality of the wireless signal is at least equal to the threshold.

4. A transmitting apparatus comprising:

a transmitter that transmits a wireless signal addressed to a receiving apparatus;

a delivery confirmation receiver that at a reception timing when a given period that starts after transmission of the wireless signal by the transmitter elapses, receives delivery confirmation information concerning the wireless signal;

a receiver that receives from a relay apparatus that regenerates and relays the wireless signal transmitted by the transmitter, relay information indicating that the wireless signal is to be regenerated and relayed; and a timing controller that delays the reception timing by a given amount, if the relay information is received by the receiver.

5. The transmitting apparatus according to claim 4, wherein the transmitter retransmits the wireless signal indicated in the relay information, if the relay information is received by the receiver, and the delivery confirmation receiver receives the delivery confirmation information concerning the wireless signal, at the reception timing when the given period that starts after retransmission of the wireless signal elapses.

6. The transmitting apparatus according to claim 4, wherein the receiver receives the relay information that includes delay information indicating a period of time that the wireless signal is delayed consequent to regeneration and relay by the relay apparatus, and the timing controller delays the reception timing by the period of time indicated in the delay information included in the relay information received by the receiver.

7. A communication system comprising:

a transmitting apparatus that transmits a wireless signal addressed to a receiving apparatus and that at a reception timing when a given period that starts after transmission of the wireless signal elapses, receives delivery confirmation information concerning the wireless signal;

a relay apparatus that regenerates and relays the wireless signal transmitted by the transmitting apparatus, and that transmits to the transmitting apparatus, relay information indicating that the wireless signal is to be regenerated and relayed; and the receiving apparatus that receives the wireless signal regenerated and relayed by the relay apparatus, wherein the transmitting apparatus delays the reception timing by a given amount, upon receiving the relay information transmitted by the relay apparatus.

8. The communication system according to claim 7, wherein the transmitting apparatus, upon receiving the relay information, retransmits the wireless signal indicated in the relay information and at the reception timing when the given period that starts after retransmission of the wireless signal elapses, receives the delivery confirmation information.

9. The communication system according to claim 7, wherein the relay apparatus gives notification of the relay information that includes delay information indicating a period of time that the wireless signal is delayed consequent to regeneration and relay by the relay apparatus, and the transmitting apparatus delays the reception timing by the period of time indicated in the delay information included in the relay information.

10. A receiving apparatus comprising:

a receiver that receives a wireless signal that is transmitted by a transmitting apparatus, and regenerated and relayed by a relay apparatus, the transmitting apparatus, after a given period that starts after transmission of the wireless signal to the receiving apparatus, receiving delivery confirmation information concerning the wireless signal;

a transmission judger that judges whether delivery confirmation information concerning the wireless signal received by the receiver can be transmitted at the reception timing at the transmitting apparatus; and a notifier that, if the transmission judger judges that the delivery confirmation information cannot be transmitted at the reception timing, notifies the transmitting apparatus of relay information indicating that the wireless signal received by the receiver is regenerated and relayed by the relay apparatus to make the transmitting apparatus to delay the reception timing by a given amount.

11. A communication system comprising a receiving apparatus, a relay apparatus that regenerates and relays a wireless signal, and a transmitting apparatus that after a given period that starts after transmission of the wireless signal to the receiving apparatus, receives delivery confirmation information concerning the wireless signal, wherein:

the transmitting apparatus transmits the wireless signal addressed to the receiving apparatus and at a reception timing when a given period that starts after transmission of the wireless signal elapses, receives delivery confirmation information concerning the wireless signal, the relay apparatus regenerates and relays the wireless signal transmitted by the transmitting apparatus, the receiving apparatus receives the wireless signal regenerated and relayed by the relay apparatus, and notifies the transmitting apparatus of relay information indicating that the wireless signal is regenerated and relayed by the relay apparatus, and the transmitting apparatus delays the reception timing by a given amount, upon receiving the relay information transmitted by the relay apparatus.

12. The communication system according to claim 11, wherein the receiving apparatus judges whether the delivery confirmation information can be transmitted at the reception timing and if the delivery confirmation information cannot be transmitted at the reception timing, notifies the transmitting apparatus of the relay information.

13. A communication method of a communication system that includes a receiving apparatus and a transmitting apparatus that after a given period that starts after transmission of a wireless signal to the receiving apparatus, receives delivery confirmation information concerning the wireless signal, the communication method comprising:

receiving and decoding the wireless signal transmitted by the transmitting apparatus;

determining whether the decoded wireless signal is subject to relay;

notifying, if the wireless signal to subject to relay, the transmitting apparatus of relay information indicating that the wireless signal is to be regenerated and relayed to make the transmitting apparatus to delay the reception timing by a given amount and the relay information including delay information indicating a period of time that the wireless signal is delayed consequent to regeneration and relay by the relay apparatus; and transmitting to the receiving apparatus, the wireless signal that has been determined to be subject to relay.

14. A communication method comprising:

transmitting a wireless signal addressed to a receiving apparatus;

receiving at a reception timing when a given period that starts after transmission of the wireless signal elapses, delivery confirmation information concerning the wireless signal;

receiving from a relay apparatus that regenerates and relays the wireless signal transmitted at the transmitting, relay information indicating that the wireless signal is to be regenerated and relayed; and performing timing control of delaying the reception timing by a given amount, if the relay information is received.

15. A communication method of a communication system that includes a relay apparatus that regenerates and relays a wireless signal, and a transmitting apparatus that after a given period that starts after transmission of the wireless signal to a receiving apparatus, receives delivery confirmation information concerning the wireless signal, the communication method comprising:

receiving the wireless signal that is transmitted by the transmitting apparatus, and regenerated and relayed by the relay apparatus;

judging whether delivery confirmation information concerning the wireless signal received by the receiver can be transmitted at the reception timing at the transmitting apparatus; and notifying, if the delivery confirmation information cannot be transmitted at the reception timing, the transmitting apparatus of relay information indicating that the received wireless signal is regenerated and relay by the relay apparatus to make the transmitting apparatus to delay the reception timing by a given amount.

\* \* \* \* \*